(12) United States Patent
Ackeret et al.

(10) Patent No.: US 8,881,659 B2
(45) Date of Patent: Nov. 11, 2014

(54) FOLDING TABLE FOR ATTACHMENT TO THE REAR SIDE OF A VEHICLE SEAT PART

(75) Inventors: Peter Ackeret, Zurich (CH); Michael Andreas Keller, Freudenstadt (DE)

(73) Assignee: Kinetix AG, Glarus (CH)

( * ) Notice: Subject to any disclaimer, the term of this patent is extended or adjusted under 35 U.S.C. 154(b) by 52 days.

(21) Appl. No.: 13/512,603

(22) PCT Filed: Dec. 6, 2010

(86) PCT No.: PCT/EP2010/007392
§ 371 (c)(1),
(2), (4) Date: Aug. 21, 2012

(87) PCT Pub. No.: WO2011/066994
PCT Pub. Date: Jun. 9, 2011

(65) Prior Publication Data
US 2012/0313404 A1  Dec. 13, 2012

(30) Foreign Application Priority Data

Dec. 4, 2009 (DE) .......................... 10 2009 056 930
Feb. 8, 2010 (DE) .......................... 10 2010 007 297
Sep. 29, 2010 (DE) .......................... 10 2010 046 871

(51) Int. Cl.
*A47B 23/00* (2006.01)
*B60N 3/00* (2006.01)
*B60N 2/44* (2006.01)

(52) U.S. Cl.
CPC ................ *B60N 3/004* (2013.01); *B60N 3/002* (2013.01); *B60N 2002/4405* (2013.01)
USPC ............................. 108/44; 108/11; 297/188.2

(58) Field of Classification Search
USPC ........................ 108/42, 44, 45, 48, 11, 50.11; 297/188.04, 188.05, 188.06, 188.07, 297/188.2, 188.21, 163
See application file for complete search history.

(56) References Cited

U.S. PATENT DOCUMENTS

| 2,787,508 | A | * | 4/1957 | Math | 297/163 |
| 4,770,107 | A | * | 9/1988 | Miller | 108/44 |
| 5,046,433 | A | * | 9/1991 | Kramer et al. | 108/44 |
| 5,269,229 | A | * | 12/1993 | Akapatangkul | 108/44 |
| 5,370,060 | A | * | 12/1994 | Wang | 108/44 |
| 5,678,741 | A | * | 10/1997 | Schieber | 224/275 |

(Continued)

FOREIGN PATENT DOCUMENTS

| CN | 201224338 Y | 4/2009 |
| DE | 696 04 646 | 6/2000 |

(Continued)

*Primary Examiner* — Daniel Rohrhoff
(74) *Attorney, Agent, or Firm* — Paul Vincent

(57) ABSTRACT

A folding table for attachment to the rear side of a vehicle seat part has a fastening device (2a, 2c) for fastening the folding table to the vehicle seat (1a, 1b, 1c), a carrier element (4) which is connected to the fastening device (2a, 2c) and extends downward from the fastening device (2a, 2c) and a tabletop (6) rotatably connected to the carrier element (4). Supporting elements (7e) are arranged on the tabletop (6) which, when the tabletop (6) is in the working position, can be moved in the direction toward the vehicle seat part (1a, 1b, 1c) by a common actuating member (7a, 7d, 7b', 7b") and can be fixed in different positions by a manually releasable latching device (6h, 7b, 7c), so that the tabletop (6) can be aligned in a horizontal position.

58 Claims, 14 Drawing Sheets

(56) References Cited

U.S. PATENT DOCUMENTS

| | | | |
|---|---|---|---|
| 5,878,672 A * | 3/1999 | Ostermann et al. | 108/44 |
| 6,085,666 A * | 7/2000 | Anderson et al. | 108/44 |
| 6,095,060 A * | 8/2000 | Ma | 108/45 |
| 6,830,292 B1 * | 12/2004 | Yoda | 297/188.06 |
| 7,281,762 B1 * | 10/2007 | Getfield et al. | 297/173 |
| 2006/0167878 A1 * | 7/2006 | Hartman | 707/8 |
| 2011/0248513 A1 * | 10/2011 | Pavone et al. | 290/1 R |
| 2013/0257114 A1 * | 10/2013 | Lee | 297/188.04 |

FOREIGN PATENT DOCUMENTS

| | | |
|---|---|---|
| FR | 2 758 506 | 7/1998 |
| WO | WO 2008/131944 | 11/2008 |
| WO | 2009/040078 | 2/2009 |

* cited by examiner

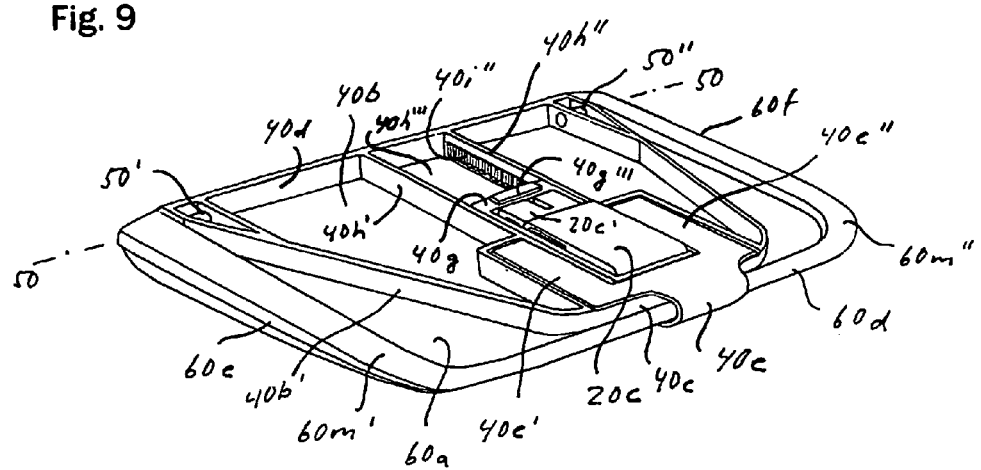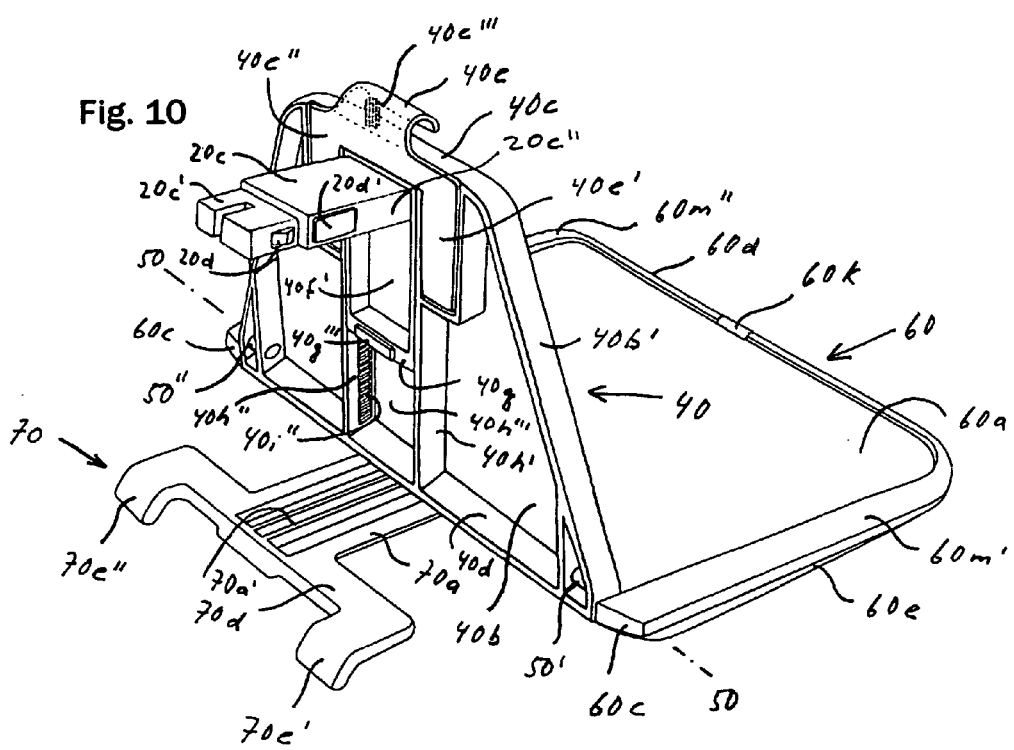

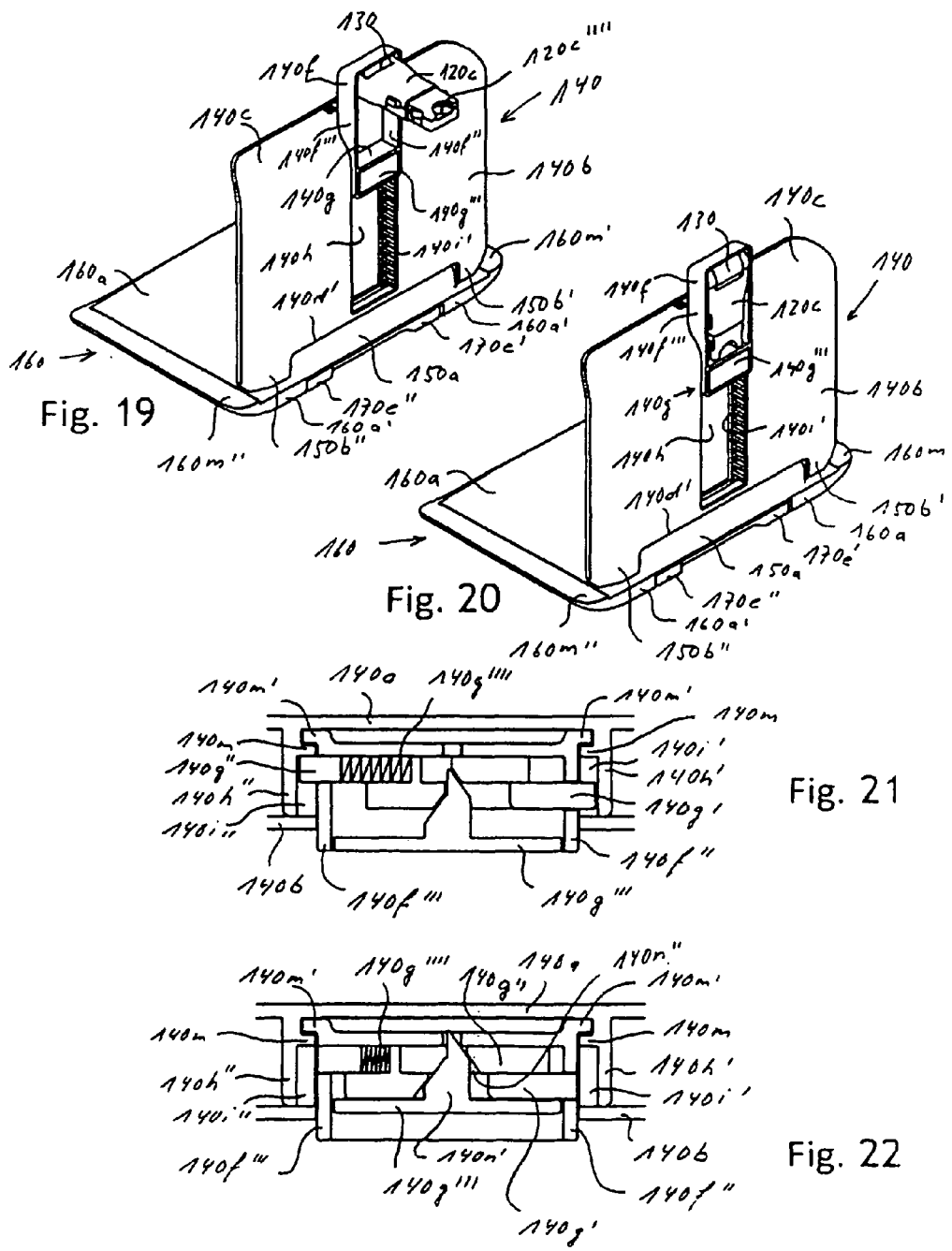

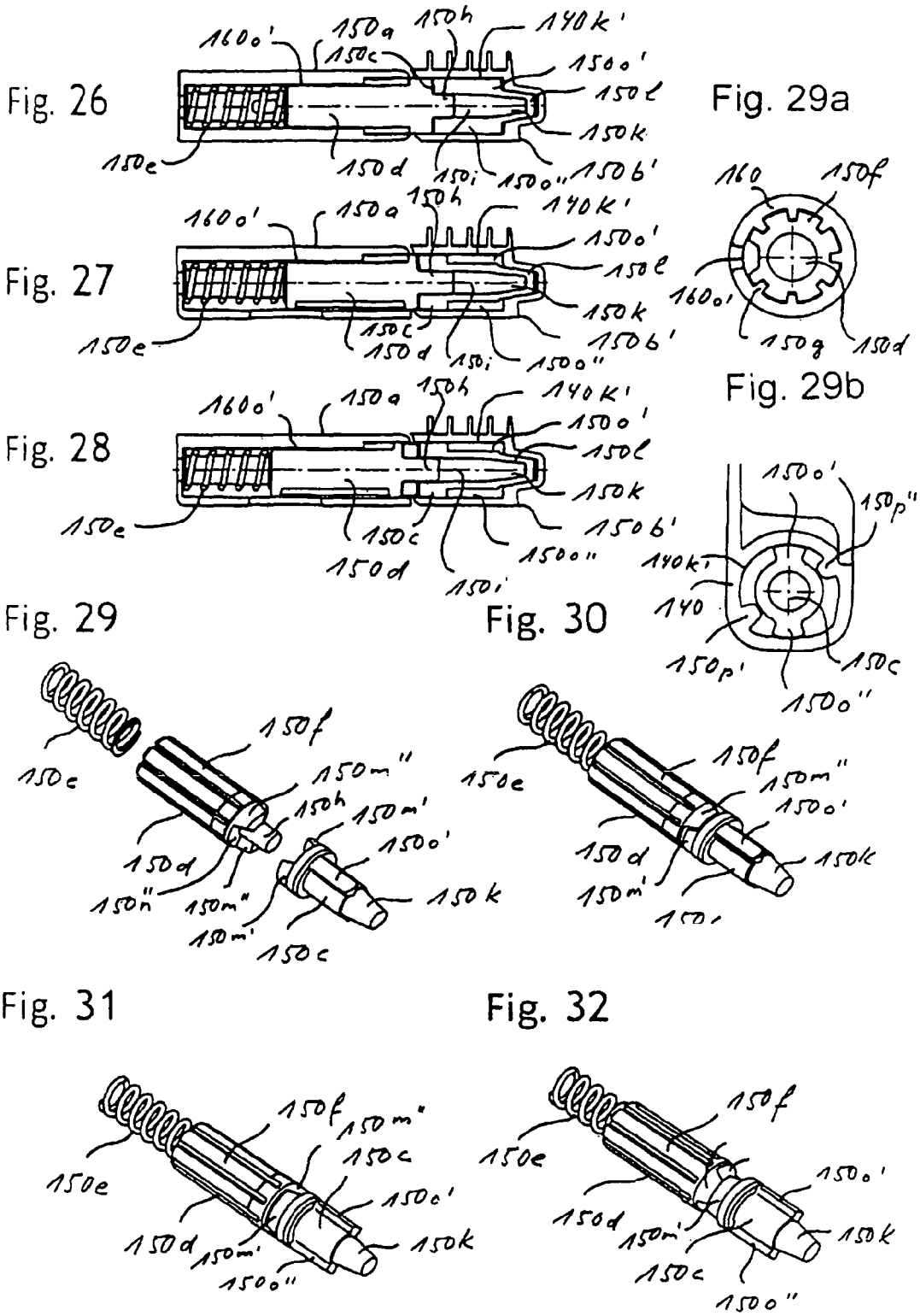

FOLDING TABLE FOR ATTACHMENT TO THE REAR SIDE OF A VEHICLE SEAT PART

This application is the nation stage of PCT/EP2010/007392 filed on Dec. 6, 2010 and claims Paris Convention Priority of DE 10 2009 056 930.8 filed Dec. 4, 2009, DE 10 2010 007 297.4 filed Feb. 8, 2010 and DE 10 2010 046 871.1 filed Sep. 29, 2010.

BACKGROUND OF THE INVENTION

The invention relates to a folding table for attachment to the rear side of a vehicle seat part, such as a backrest, head support or head support mounting of a vehicle seat.

Folding tables, mounted on the rear side of a backrest of a vehicle seat, are widespread, especially in buses and large passenger vehicles, and are usually already installed by the vehicle manufacturer.

Such folding tables are usually disposed on the rear side of the backrest by means of a pivot joint. They can be pivoted back and forth between non-working position, in which they are essentially against the rear side of the backrest, into a working position, in which they extend approximately horizontally from the rear side of the backrest.

If the inclination of the backrests can be adjusted, it must be possible to adjust the angle of inclination between the backrest and the tabletop or the stop that defines the working position of the tabletop, so that the tabletop retains its horizontal orientation in the working position with a different inclination of the backrest.

Because the tabletop has to be very stably supported on the backrest when in the working position, a relatively complicated joint mechanism is required that is unsatisfactory, also in terms of user friendliness.

To avoid the folding table also being inclined on a backrest whose inclination can be adjusted, solutions are known in which side struts are provided as folding table holders that are mounted on a fixed part of the vehicle seat and are not therefore also inclined with the backrest.

However, these solutions require interventions in the vehicle seats and are therefore only suitable for equipment already installed in the factory.

Folding tables are also offered on the market for equipping vehicles with folding tables that have not already been installed in the factory. These are very practical because they are only mounted on the seats when they are required and can be removed from the seats again when not in use.

However, the folding tables offered for retrofitting are mostly very difficult to mount on the vehicle seats and unstable in use because no provision is made in the factory to mount them. Moreover, such retrofitting folding tables have to cover a wide variety of vehicle models with the most varied installation situations.

The backrests on which such folding tables are mounted often have different heights and contours and the positions and locations of the tabletops of such folding tables can also greatly vary due to adjustment of seat height and inclination of the backrest.

Moreover, the rear seats from which such folding tables are used have different heights in different vehicle models and the users of such folding tables are of different statures.

The object of the invention is to constitute a folding table of the type stated above such that it can simply, quickly and stably be mounted on and removed from the rear side of vehicle seats with different dimensions, contours and seat settings.

SUMMARY OF THE INVENTION

This object is inventively achieved with a folding table for mounting on the rear side of a vehicle seat part, such as a backrest, head support or head support mounting of a vehicle seat, with the characteristics of the independent claim. Advantageous embodiments of the invention are defined in the dependent claims.

According to a first aspect of the invention, a folding table is proposed, comprising a fastening device for fastening the folding table to the vehicle seat part, a carrier element which is connected to the fastening device and extends downward from the fastening device, a tabletop rotatably connected to the carrier element via a first joint at the lower end of the carrier element, which can be pivoted between a non-working position, in which the tabletop is aligned approximately parallel with the carrier element, and a working position, in which the tabletop is at an angle of approx. 80° to 120° with the carrier element, wherein the carrier element is connected to the fastening device via a second joint, whose axis of rotation extends parallel with the axis of rotation of the first joint wherein supporting elements are arranged on the tabletop which, when the tabletop is in the working position, can be moved in the direction toward the vehicle seat part by a common actuating member and can be fixed in different positions by a manually releasable latching device, so that the tabletop can be aligned in a horizontal position and is supported on the vehicle seat part against loads.

With this design, the folding table can simply and quickly be adapted to different inclinations of the backrest.

The position of the center of gravity results in the carrier element with the tabletop pivoting about the axis of rotation of the second joint against the rear side of the backrest until it lies against the carrier element.

The supporting element can be moved the right distance out of the tabletop against the rear side of the backrest for the tabletop to be aligned horizontally. Depending on the inclination of the backrest, the supporting element is moved more or less far out of the tabletop, so that the supporting element supports and stabilizes the tabletop against loads in the set horizontal position on the backrest.

Two propping elements are preferably provided for stable support of the tabletop on the backrest and are disposed symmetrically with respect to the center of the rear end face of the tabletop. The propping elements can be held such that they can rotate or be linearly displaced on the tabletop and moved via a separate actuating member.

According to a preferred embodiment, the propping elements and the actuating member together form an integral supporting element that is guided in a linear guide on the underside of the tabletop.

In a further embodiment, the supporting element is guided in a linear guide aligned perpendicularly with respect to the rear end face of the tabletop. One preferably centrally disposed guide, or two guides disposed parallel can be used.

Preferably, recesses or receiving spaces are provided on the tabletop in which the supporting element is held when in the non-working position. These can be disposed inside the tabletop or as trough-like depressions or as a cut-out on the outside of the tabletop.

In a preferred embodiment, a U-shaped guide rail that is open to the outside is disposed centrally on the underside of the table in which the supporting element is guided in alignment with the outside of the tabletop.

In a further embodiment, the supporting element is T-shaped with a guide shaft that is guided in a guide rail disposed centrally on the tabletop and a supporting plate aligned transversely to the guide shaft facing toward the vehicle seat part, the supporting plate extending an approximately equal distance toward the lateral end faces of the tabletop on both sides of the guide shaft and having propping elements disposed at its free ends that rest on the vehicle seat part.

The carrier element is connected to the fastening device preferably centrally at the upper end, whereby a stable 3-point support results in conjunction with the two propping elements mounted at the ends of the supporting plate.

The propping elements preferably project beyond the supporting plate, it being thus ensured that both propping elements are in contact with the vehicle seat part, even if the latter's outer contour is cambered.

The propping elements are preferably provided with rounded and/or flexible contact surfaces that adapt themselves to the different contours to avoid damage to the rear sides of the vehicle seat parts.

The supporting element could also be formed as a U-shaped bow whose two legs form the guides that are guided in the tabletop and whose base forms the pressing plate.

In a preferred embodiment of the invention, the supporting element is provided with a latching device with a toothed rack disposed on the tabletop that extends approximately over the extension path of the supporting element and a latching element disposed on the supporting element that is under spring force when engaged with the toothed rack and can be disengaged from the toothed rack by means of a release button.

In a further embodiment, the latching device on the supporting element can also be constituted as a ratchet pawl so that the supporting element can be pushed out of the tabletop without actuating the release button and the release button only has to be actuated for pushing back into the tabletop.

The release button is preferably disposed close to the rear end of the guide shaft, together with a grip strip, with which the supporting element can be displaced in both directions after the release button has been operated.

On the underside of the tabletop, a cutout is preferably provided in which the release button and the grip strip are accessible along the entire displacement path.

According to a second aspect of the invention, a folding table is proposed, comprising a fastening device for fastening the folding table on the vehicle seat part and a carrier element connected to the fastening device that extends downward from the fastening device, a tabletop rotatably connected to the carrier element via a first joint at the lower end of the carrier element, which can be pivoted between a non-working position, in which the tabletop is aligned approximately parallel with the carrier element, and a working position, in which the tabletop is at an angle of approx. 80° to 120° with the carrier element, wherein the carrier element is connected to the fastening device via an adjustment slide so that the distance between the tabletop and the fastening device can be adjusted.

With this design, the user can simply and quickly adjust the height of the tabletop to different heights and settings of the backrest and to different sizes and needs of the users.

According to a preferred embodiment, for height adjustment of the tabletop, the rear side of the carrier element has a guide channel that extends essentially vertically over the height of the carrier element and is open in the upward direction in which a linearly displaceable adjustment slide is held that is fixed in different positions with a manually releasable latching device and can be slid completely into the guide channel for space-saving stowage of the folding table.

The guide channel is preferably disposed in the center of the carrier element formed as a hollow body and recessed so far into the interior space that the outer contours of the adjustment slide are approximately flush with the outer contours of the carrier element. Toothed racks for the latching device are disposed on the side walls facing each other of the preferably U-shaped guide channel.

The adjustment slide is preferably connected to the fastening device at the upper end via a second joint whose axis of rotation extends parallel with the axis of rotation of the first joint.

In one embodiment, the upper end of the adjustment slide has a plug element attached via a joint, with which the folding table can be detachably connected with the fastening device. The adjustment slide preferably has a receiving space into which the plug element can be folded for space-saving stowage of the folding table.

According to a further embodiment, the lower end of the adjustment slide has a cross-member in which the latching device is mounted. In a preferred embodiment, the latching device comprises two locking bars that are held engaged with the toothed racks disposed on the side walls of the guide channel by a locking spring, transversely to the direction of displacement of the adjustment slide. The locking bars are preferably disengaged from the toothed rack by means of a common locking button that is disposed above the locking bars and forms the outside of the cross-member so that the latch can be released and the adjustment slide displaced.

In a preferred embodiment, the carrier element can be pivoted so far upward about the second joint such that the locking button can be easily accessed by the user and the height adjustment can be made easily without removing the folding table from the vehicle seat.

According to a third aspect of the invention, a folding table is proposed, comprising a fastening device for fastening the folding table to the vehicle seat part and a carrier element connected to the fastening device that extends downward from the fastening device and a tabletop at the lower end of the carrier element rotatably connected with the carrier element via a first joint, that can be pivoted between a non-working position, in which the tabletop is aligned approximately parallel with the carrier element, and a working position, in which the tabletop is at an angle of approx. 80° to 120° with the carrier element, wherein an overload protection mechanism, which permits the tabletop to be pivoted downward out of the working position if the tabletop is overloaded, and a supporting element for supporting the tabletop on the vehicle seat part, which can be fixed in the working position of the tabletop toward the vehicle seat part movably and in different positions, are disposed on the tabletop, and wherein the supporting element is connected to the tabletop via a mounting that is released by the application of force to the supporting element resulting from pivoting away the tabletop so that the downward pivot-away movement of the tabletop is not impeded below by the supporting element.

This design has the advantage that the overload protection mechanism ensures that exceeding the limit load of the tabletop cannot result in damage to the folding table or the vehicle seat or injure passengers in case of an accident.

According to a preferred embodiment, the first joint is formed by two axially aligned joint sections. Joint extensions are preferably formed at the lower end of the carrier element and at the rear end of the tabletop and engage with each other to form hollow-cylinder-shaped inner and outer receiving spaces for first and second latching bolts that are pressed against each other by compression springs.

The first and second latching bolts are preferably constructed with mirror symmetry so that they can be used for both joint sections. Both latching bolts preferably have cylindrical lateral surfaces and thus form the axes of rotation of the first joint.

Axially aligned longitudinal ribs are preferably disposed on the lateral surface of one of the latching bolts and intermesh with axially aligned mating ribs correspondingly disposed on the inner lateral surface of the receiving space so that the latching bolt is secured against twisting and can move axially in the receiving space.

Axially aligned stop ribs are preferably disposed on the lateral surface of the other latching bolt and form a stop to limit the angle of rotation in conjunction with axially aligned mating ribs on the inner lateral surface, wherein the free end face of the latching bolt is preferably constituted as a cone that is held in a cone-shaped bearing shell in the inner end face of the receiving space that forms a stop for the axial movement of the latching bolt as well as a friction brake to inhibit the rotary movement of the latching bolt.

According to a preferred embodiment, the end faces of the two latching bolts that face each other have coupling claws and claw pockets that engage with each other and form a claw coupling, wherein the flanks of the coupling claws and the claws pockets are conical so that, when a certain limit load of the tabletop is exceeded with the corresponding increase in torque, the two latching bolts are pressed further and further apart against the force of the compression spring until the claw coupling disengages and the tabletop can fold down out of the working position.

In a preferred embodiment, the mounting, with which the supporting element is connected to the tabletop, comprises a guide slide that is guided in a guide rail on the tabletop, wherein the supporting element is pivotably connected at its rear end to the rear end of the guide slide and is releasably held at the front end of the guide slide by a spring clip so that, with enough force, the supporting element is pressed out of the spring clip and can pivot away downward about the pivot axle.

In a further preferred embodiment, the carrier element is connected to the fastening device via a coupling with a manually releasable latching device, wherein the coupling comprises a receiving socket disposed on a fastening element and a plug element connected to the carrier element, preferably via the second joint, it being possible to plug the carrier element into the receiving socket and latch it there.

In a preferred embodiment, the fastening element is constituted as a clamping element that can be clamped between the two bars of the head support mounting, wherein the receiving socket is disposed approximately centrally on the clamping element.

In a further embodiment, the upper end of the carrier element has a locking element with which the tabletop is held, at its front end face in the non-working position, on the carrier element.

The upper end of the carrier element is preferably cambered against the tabletop and covers the front end face of the tabletop in the non-working position, wherein the locking element projects from an opening in the cambered inner side of the carrier element and engages in a recess disposed on the end face of the tabletop.

In a further preferred embodiment, an extendable cup holder is disposed on the front side of the carrier element and can be folded into a working position, aligned approximately parallel with the tabletop, from a non-working position, in which it is held in a shell-shaped recess in the carrier element, wherein a spring-loaded latching element preloads and fixes the cup holder in the non-working position and in the working position.

The cup holder can preferably by pivoted downward out of the working position against the tabletop on overload.

Further preferred embodiments of the invention result from the remaining characteristics stated in the dependent claims.

It is understood that the features stated above and below can be used not only in the stated combination but also in other combinations or alone without departing from the scope of this invention.

BRIEF DESCRIPTION OF THE DRAWING

The invention is explained in more detail below in examples based on the relevant drawings. The figures show:

FIG. 9 shows a perspective view from behind, of the folding table according to FIG. 7.

FIG. 10 shows a perspective view from behind, of the folding table according to FIG. 8, separate from the vehicle seat, in the working position, with both the plug element and supporting element extended

FIG. 19 shows a perspective view from behind, of the folding table in the working position with the adjustment slide in the uppermost position and the plug element folded out.

FIG. 20 shows a perspective view of the folding table according to FIG. 19 with the plug element folded in FIG. 21 shows a sectional detail view of the latching device of the adjustment slide in the latched position FIG. 22 shows a sectional detail view of the latching device of the adjustment slide according to FIG. 21 in the unlatched position

FIG. 26 shows a sectional detail view of a joint section of the first joint with the two latching bolts and the compression spring in the non-working position.

FIG. 27 shows a sectional detail view of a joint section of the first joint with the two latching bolts and the compression springs in the working position.

FIG. 28 shows a sectional detail view of a joint section of the first joint with the two latching bolts and the compression spring in the overload position.

FIG. 29 shows an exploded view of the two latching bolts with the compression spring FIG. 29a shows a sectional detail view of the second latching bolt of the first joint, mounted in the tabletop FIG. 29b shows a sectional detail view of the second latching bolt of the first joint, mounted in the carrier element FIG. 30 shows a perspective view of the two latching bolts with the compression spring in the non-working position according to 26.

FIG. 31 shows a perspective view of the two latching bolts with the compression spring in the working position according to 27.

FIG. 32 shows a perspective view of the two latching bolts with the compression spring in the overload position according to 28.

DESCRIPTION OF THE PREFERRED EMBODIMENT

Figure 1:
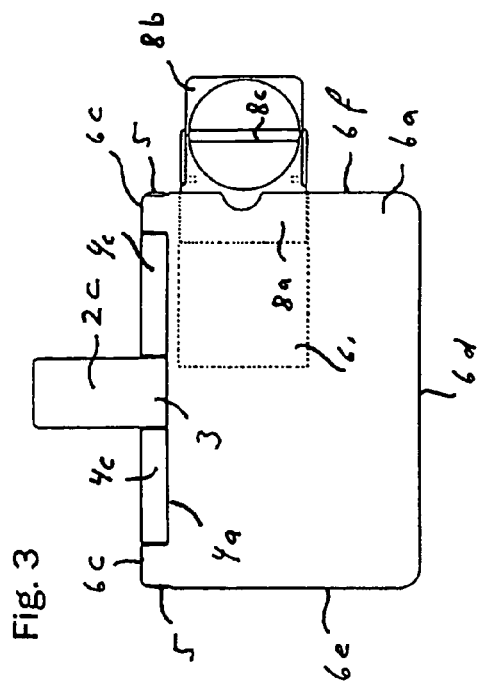
FIG. 1 shows a perspective view of a first variant of the inventive folding table in the non-working position with the plug element folded out, separate from the fastening element connected to the head support mounting of a vehicle seat.

FIGS. 1 to 4 show a first variant of the folding table. The receiving socket 2b is fastened to the head support bars 1c of the vehicle 1 by the fastening elements 2a.

The plug element 2c is rotatably connected via the second joint 3 to the upper end 4c of the carrier element 4 and can be pivot between a non-working position, in which the plug element 2c rests parallel against the rear side 4b on the carrier element 4, and a working position, in which the plug element 2c is at an angle of approx. 90° to the carrier element 4.

Figure 5:
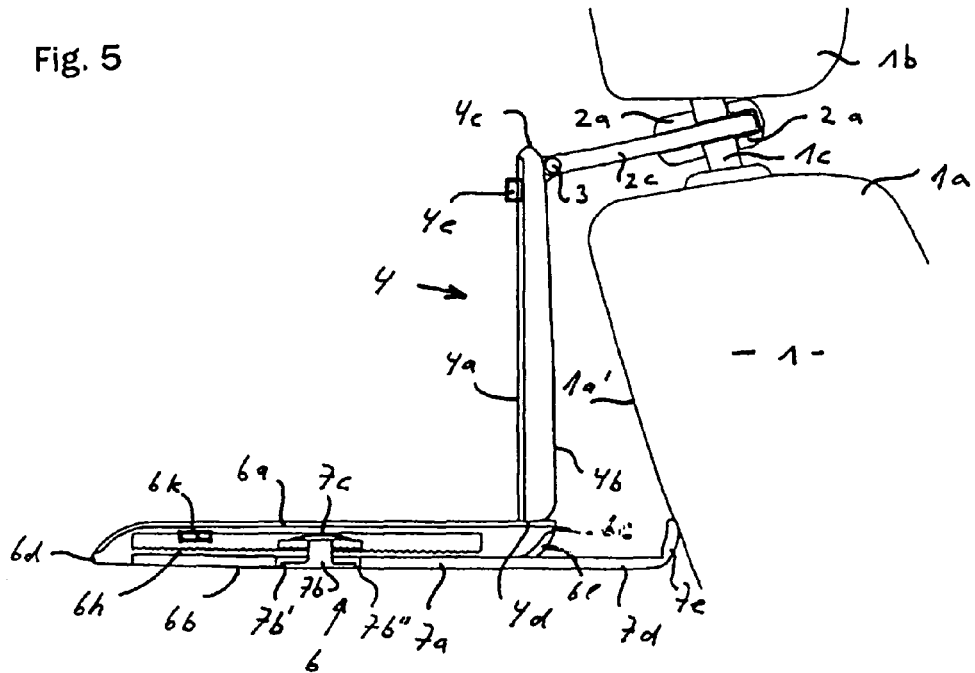
FIG. 5 shows a cross-section of a second variant of the inventive folding table, mounted with the fastening device on the head support mounting of a vehicle seat in the working position and with extended supporting element.

The carrier element 4 extends from the second joint 3 vertically downward and is at an acute angle with the rear side 1a' of the backrest 1a (FIG. 5).

Figure 2:
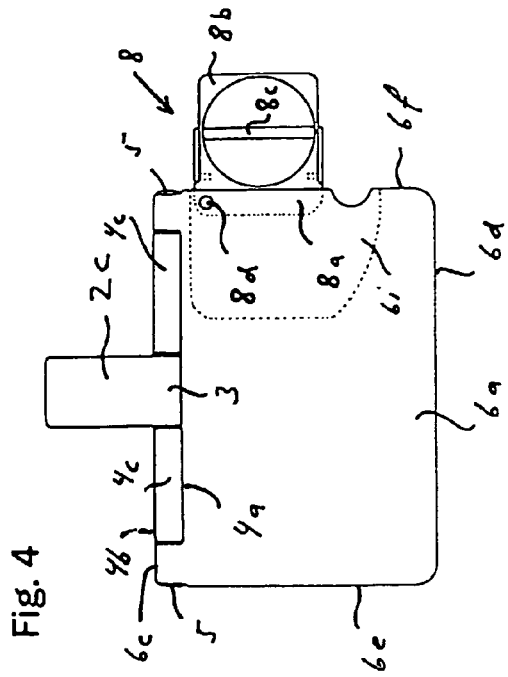
FIG. 2 shows a perspective view of the folding table according FIG. 1, connected with the fastening element in the working position and the cup holder in the working position.

The tabletop 6 is rotatably connected to the carrier element 4 at the lower end 4d of the carrier element 4 via the first joint 5 and can be folded between a non-working position, in which the tabletop 6 is aligned parallel with the carrier element 4 (FIG. 1), and a working position, in which the tabletop 6 is at angle of approx. 90° to the carrier element 4 (FIG. 2).

Figure 3:
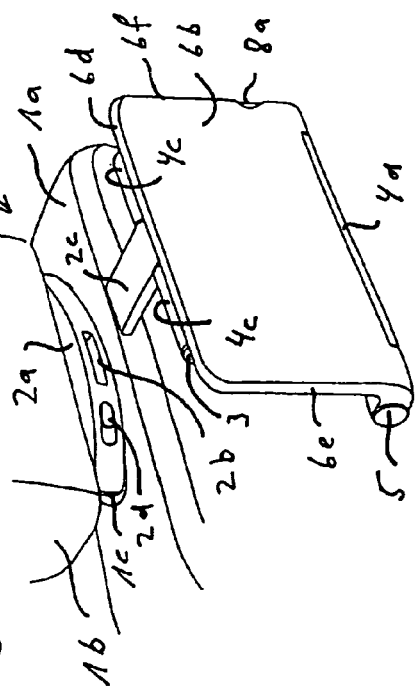
FIG. 3 shows a view from above onto the inventive folding table according to FIG. 2, without the fastening element with the plug element folded out and a first variant of the cup holder in the working position.

A receiving space 6i is provided in the tabletop 6 which is open on the lateral end face 6f of the tabletop 6. The receiving space 6i is a cup holder 8 that is guided in the receiving space by means of a guide plate 8a and can be moved linearly in the working position (FIGS. 2 and 3).

The guide plate 8a has a supporting ring 8b that extends round the liquid container and a pivotably connected supporting bow that can be folded downward to support the liquid container from below.

Figure 4:
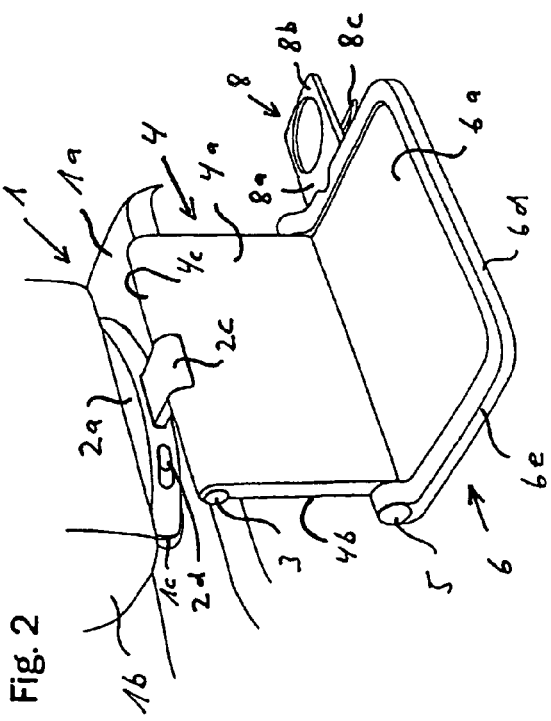
FIG. 4 shows a view from above onto the inventive folding table according to FIG. 2, without the fastening element with the plug element folded out and a second variant of the cup holder in the working position.

FIG. 4 shows a variant with a cup holder 8 that is pivoted out around a pivot joint 8d disposed vertically in the receiving space 6i.

Figure 6:
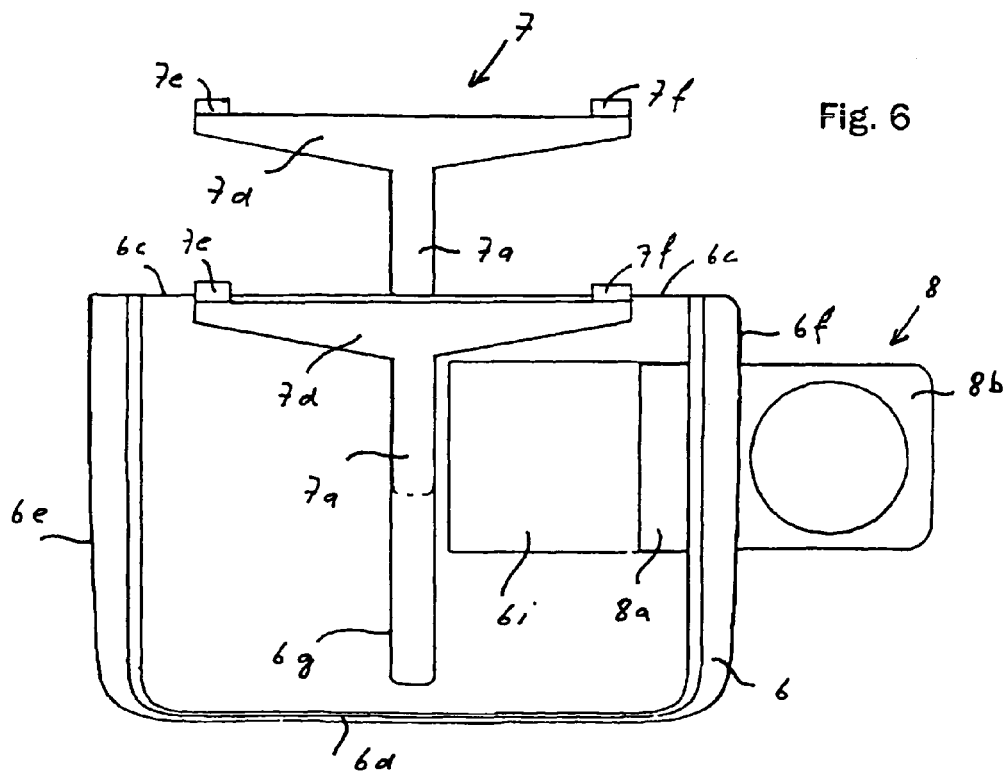
FIG. 6 shows a partially cutaway detailed view from above, of the tabletop of the folding table according to FIG. 5 with the supporting element retracted and extended and the cup holder in the working position
Figure 7:
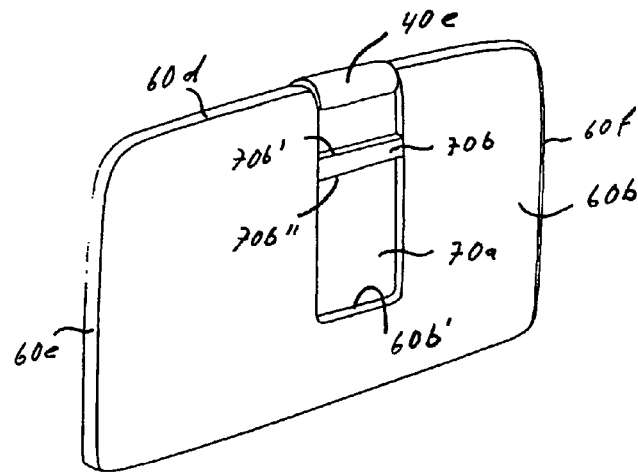
FIG. 7 shows a perspective view from the front, of a third variant of the inventive folding table, separate from the vehicle seat, in the non-working position with the plug element folded in and the supporting element retracted
Figure 8:
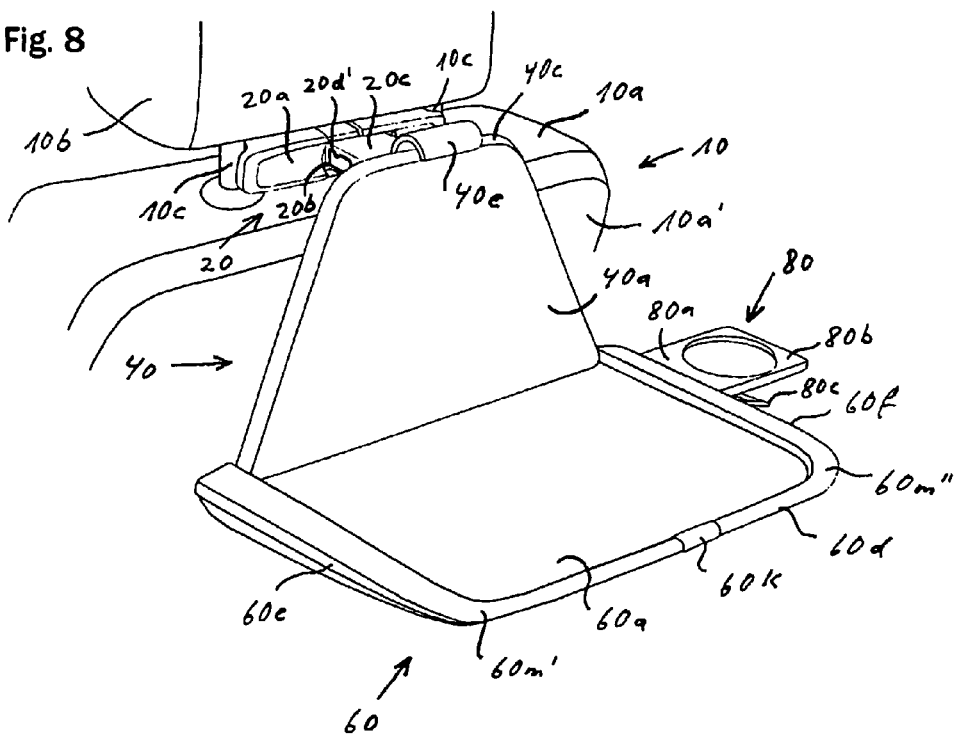
FIG. 8 shows the folding table according to FIG. 7, mounted with the fastening device on a vehicle seat in the working position and with the cup holder in the working position.

FIGS. 5 and 6 show a second variant of the folding table with a supporting element 7 that can be extended out of the tabletop 6. FIG. 5 shows the folding table fastened on the head support mounting 1c of the vehicle seat 1 with the tabletop 6 in the working position. The carrier element 4 is at an acute angle with the rear side 1a' of the backrest 1a.

The underside 6b of the tabletop 6 has the centrally positioned guide rail 6g in which the guide shaft 7a of the T-shaped supporting element 7 is guided (FIG. 6). The supporting plate 7d is mounted on the front end of the supporting element 7 and extends parallel to the rear end face 6c of the tabletop 6 and to an equal distance toward the two lateral end faces 6e, 6f of the tabletop 6 on both sides of the guide shaft 7a.

Supporting elements 7e, 7f are mounted at the two free ends of the supporting plate 7d and rest on the rear side 1a' of the backrest 1a when the supporting element 7b is extended.

The rear end face 6c of the tabletop 6 has a recess 6i that receives the supporting plate 7d in the pushed-in position of the supporting element 7.

The guide rail 6g disposed in the tabletop 6 has a toothed rack 6h into which a latching element 7c, disposed at the rear end of the guide shaft 7a, engages and latches the supporting element 7.

The latching element 7c is held engaged with the toothed rack 6h by spring force and is disengaged from the toothed rack 6h by pressing the release button 7b. Grip strips 7b', 7b" on which the supporting element 7 can be displaced on both sides after releasing the latch 6h 7b, 7c are disposed in front of and behind the release button 7b.

A first magnetic element 4e is disposed centrally on the front side 4a at the upper end of the carrier element 4 and forms a lock for fixing the tabletop in its non-working position in conjunction with a second magnet element 6k positioned at the corresponding position on the top side 6a of the tabletop 6.

FIGS. 7 to 12 show a third variant of the folding table. The fastening device 20 comprises a fastening element 20a constituted as a clamping element that is inserted between the two bars of the head support mounting 10c. The fastening element 20a has a roughly centrally disposed receiving socket 20 into which the plug section 20c' of the plug element 20c foldably connected via a pivot on the rear side 40b of the carrier element 40 can be inserted and latched by means of latching devices 20d disposed on both sides of the plug section 20c' (FIG. 10). The unlatching buttons 20d' disposed on the side surfaces 20c'' and 20c' of the plug element 20c are pressed toward each other and the plug section 20c' is pulled out of the receiving socket 20b to release the latching devices 20d.

Figure 11:
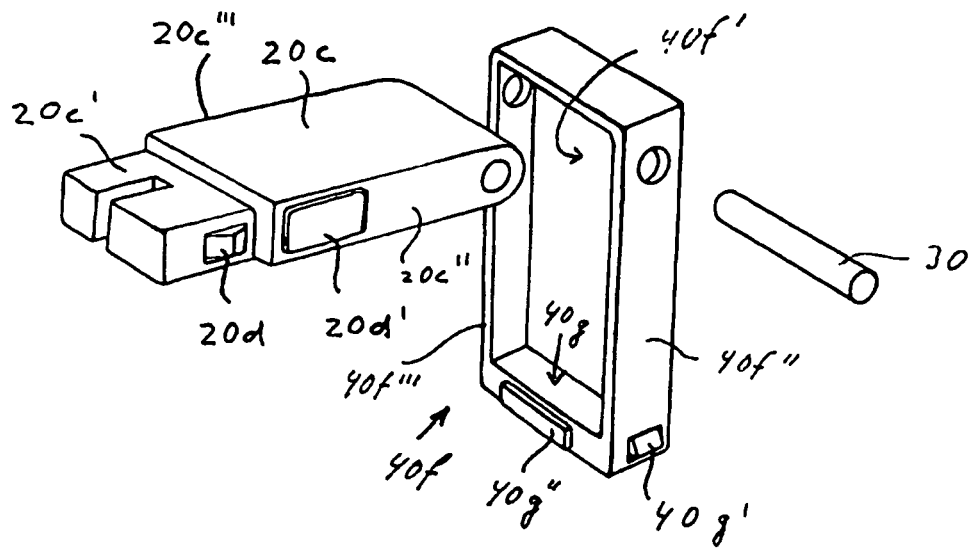
FIG. 11 shows, in a perspective view, details of the height adjustment with the adjustment slide and plug element.

The plug element 20c is connected to axle 30 which forms the second joint with the frame-shaped adjustment slide 40f which is guided in a guide channel 40h''' between the guide ribs 40h', 40h'' on the rear side 40b of the carrier element 40 such that it can be linearly displaced. The adjustment slide 40f has a receiving space 40f' into which the plug element 20c can be folded in for space saving stowage (FIG. 11).

Figure 12:
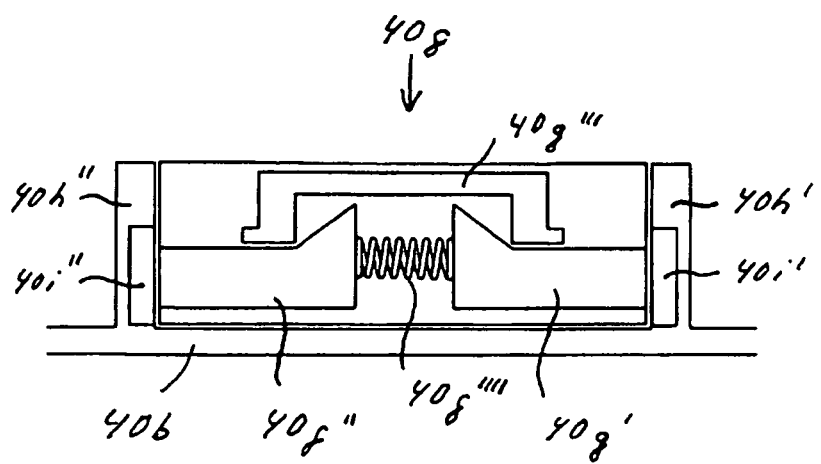
FIG. 12 shows a cross-section through the latching device of the adjustment slide.
Figure 13:
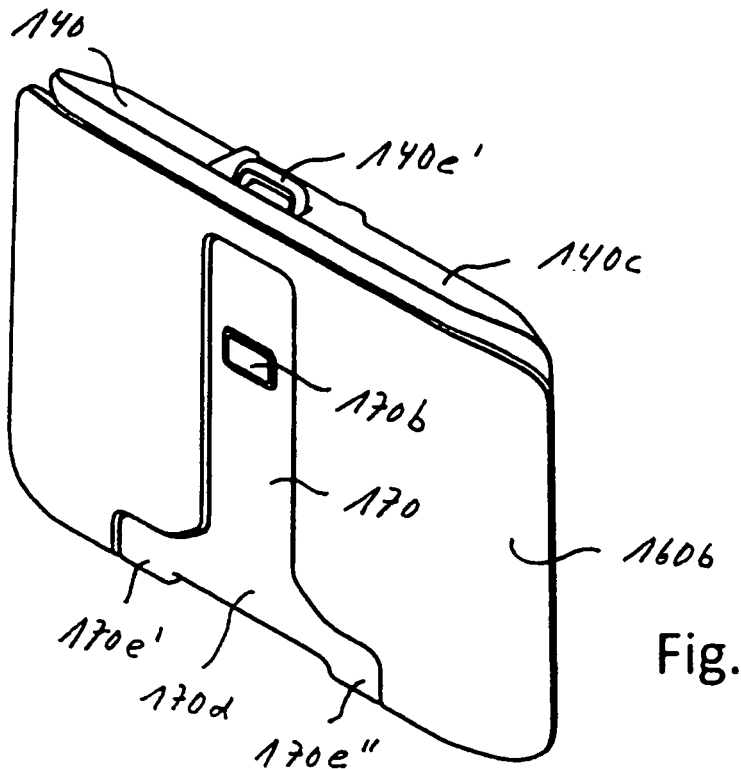
FIG. 13 shows a perspective view from the front, of a fourth variant of the inventive folding table, in the non-working position with the adjustment slide in the lowermost position, the plug element folded in, and the supporting element retracted.

The adjustment slide 40f below the receiving space 40f' has a U-shaped cross-member 40g in which a latching device with two locking bars 40g', 40g'', which are pressed apart by a locking spring 40g''', is mounted (FIG. 12).

The side walls 40f'', 40f''' of the adjustment slide 40f have openings through which the locking bars 40g', 40g'' project and engage in the toothed racks 40i', 40i'' disposed on the guide ribs 40h', 40h''. By pressing the locking button 40g''', the locking bars 40g', 40g'' are moved toward each other, thus releasing the latch so that the adjustment slide 40f can be pushed into the desired position and the table height can be set.

The upper end 40c of the carrier element 40 has a centrally disposed locking element 40e with which the tabletop 60 can be locked on the carrier element 40 in the non-working position. The locking element 40e is linearly guided with two guide legs 40e', 40e'' arranged in the shape of a fork on the outsides of the guide ribs 40h', 40h'' and preloaded with the tension spring 40e''' in the latched position.

A locking bar 60k is disposed in the center of the front end face 60d of the tabletop 60 over which the locking element 40e slips when the tabletop 60 is folded up and behind which the locking element 40e latches without the surfaces of the edge bars 60m', 60m'' that surround the front end face 60d and the lateral end faces 60e, 60f of the tabletop 60 being scratched.

The supporting element 70 is fork-shaped and guided centrally in the tabletop 60 with a guide 70a' disposed on the guide shaft 70a. The underside of the guide shaft 70a has a release button 70b (FIG. 7) with which the latch of the supporting element 70 in the tabletop 60 (according to the principle shown in FIG. 5) can be released.

The underside 60b of the tabletop 60 has a central a cutout 60b' in which the release button 70b that extends over the width of the cutout 60b' is accessible along the entire displacement path of the supporting element 70.

The end faces 70b', 70b'' of the release button 70b are constituted such that the release button 70b is also used as a grip strip for moving the supporting element 70.

The cutout 60b' extends as far as the front end face 60d of the underside 60b of the tabletop 60 so that the locking element 40e does not project beyond the underside 60b while the tabletop 60 is closed.

The supporting plate 70d is disposed transversely to the guide shaft 70a at the end of the guide shaft 70a that faces toward the rear end face 60c of the tabletop 60 and extends as far as the two joint sections 50', 50'' of the first joint 50 on both sides. The two ends of the supporting plate 70d have the supporting elements 70e', 70e'', which face backward.

The carrier element 40 is constituted as an integral plate that is reinforced by a surrounding edge wall 40b'. The first joint 50 comprises two joint sections 50', 50'', which are disposed at the lower end 40d behind the rear side 40b and near to the outside edges on the carrier element 40.

Edge bars 60m', 60m'' are disposed on the front end face 60d and the lateral end faces 60e, 60f of the tabletop 60 and project beyond the top side of the tabletop 60 to surround the carrier element 40 on both sides.

The joint sections 50', 50'' are connected above the top side 60a to the edge walls 60m', 60m'' in such a way that the carrier element 40 is inside the edge walls 60m', 60m'' when the tabletop 60 is folded up (FIG. 9).

The carrier element 40 is constituted as an isosceles trapezoid so that the flow of force is transmitted as stably as possible from the second joint 30 to the two joint sections 50', 50'' with minimum dimensions of the carrier element 40.

FIGS. 13 to 40 show a fourth variant of the folding table. The carrier element 140 is cambered at the upper end 140c against the tabletop 160 and covers the front end face 160d of the tabletop 160 in the non-working position.

Figure 17:
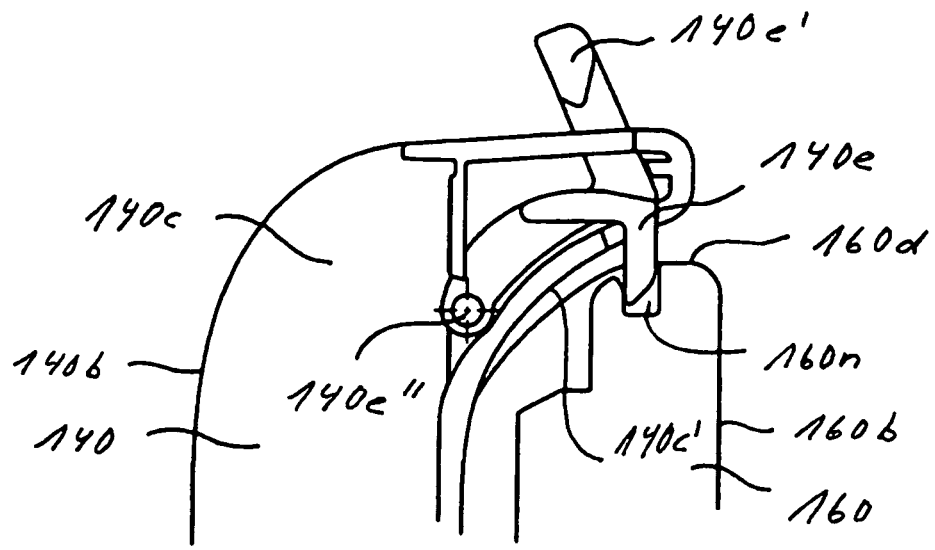
FIG. 17 shows a sectional detail view of the latching mechanism for the tabletop in the latched position

The end face 160d of the tabletop 160 has a recess 160n into which a locking element 140e disposed on the cambered inner side 140c' of the carrier element 140 engages and holds the tabletop in the non-working position (FIG. 17).

Figure 18:
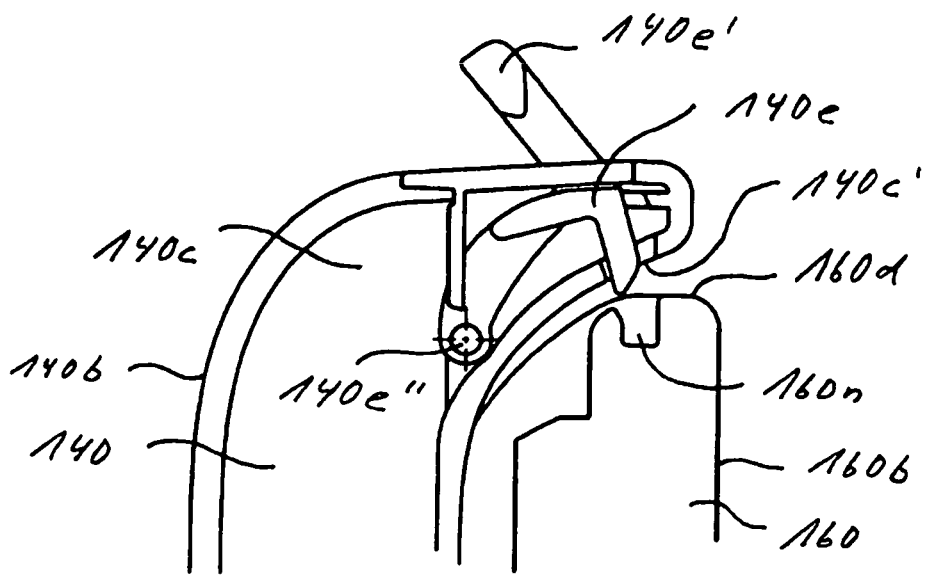
FIG. 18 shows a sectional detail view of the latching mechanism for the tabletop according to FIG. 17 in the unlatched position

Carrier element 140 has a pivot bearing 140e'' that forms the pivot joint for the locking element 140e. The locking element 10e is held engaged with the recess 160n with a leg spring (not depicted) and can be moved out of the recess 160n to release the tabletop 160 with the bow-shaped actuating member 140e' (FIG. 18).

The width of the tabletop 160 is greater than the width of the carrier element 140 so that the lateral edge walls 160m', 160m'' which are higher than the top side 160a of the tabletop 160 can project beyond the carrier element 140 at the side and receive the latter between them when in the non-working position.

The lower end 140d of the carrier element 140 has a centrally disposed cutout 140d' into which a central joint extension 150a, disposed at the rear end 160a' of the tabletop 160 perpendicular to the top side 160a of the tabletop 160, protrudes.

Figure 41:
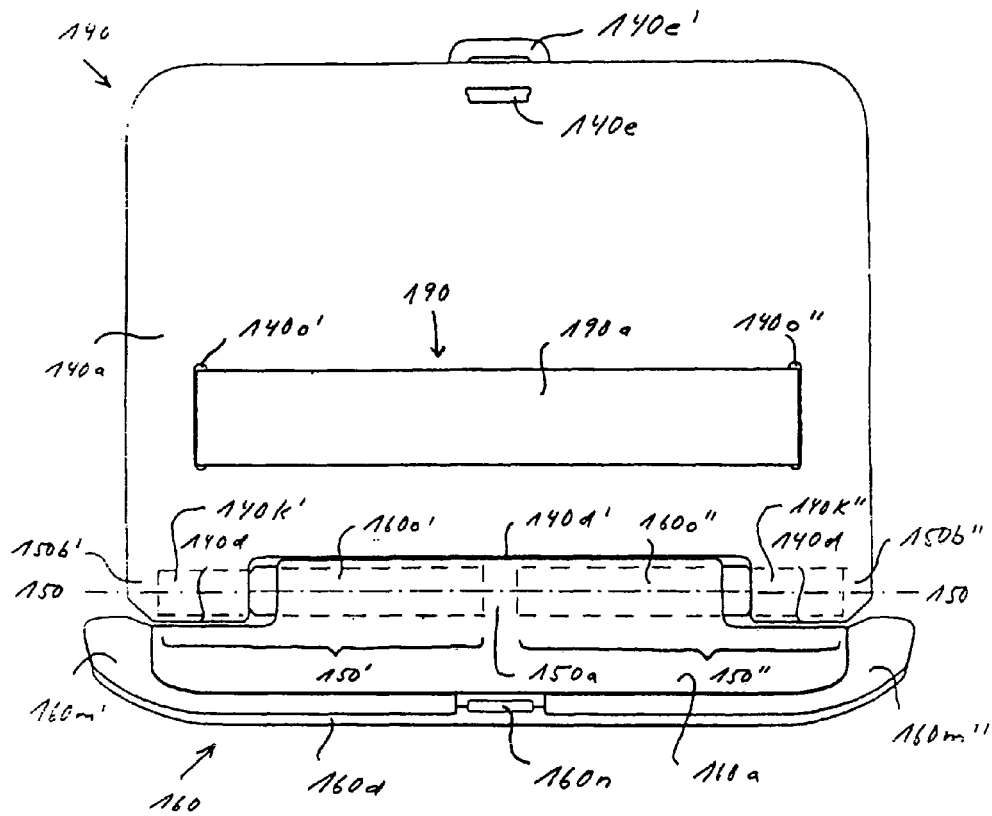
FIG. 41 shows a view from the front, of the folding table in the working position with a holding device on the carrier element.

The central joint extension 150a of the tabletop 160 and the two lateral joint extensions 150b', 150b'' of the carrier element 140 have hollow-cylinder-shaped inner and outer receiving spaces 160o', 160o'', 140k', 140k'' for the two joint sections 150', 150'' of the first joint 150 (FIG. 41).

The two joint sections 150' and 150'' are structured with mirror symmetry so that identical components can be used and comprise a first latching bolt 150c that is received in the outer receiving space 140k', 140k'' and a second latching bolt 150d that is pressed with a compression spring 150e against the first latching bolt 150c and is received together with the compression spring 150e in the inner receiving space 160o', 160o'' (FIGS. 26 to 32).

The first latching bolt 150c has a cylindrical lateral surface with two diametrically disposed axially aligned stop ribs 150*o*', 150*o*". The inner lateral surface of the outer receiving space 140*k*', 140*k*" has two diametrically disposed axially aligned counterstops 150*p*', 150*p*" that limit the angle of rotation of the first latching bolt 150*c* to 90° (FIG. 29*b*).

The outward facing end face of the first latching bolt 150*c* is constituted as a cone 150*k* which is held in a cone-shaped bearing shell 150*l* on the inner end face of the outer receiving space 140*k*', 140*k*" which forms a stop for the outward axial movement of the first latching bolt 150*c* and a friction brake 150*k*, 150*l* to inhibit the rotary movement of the latching bolt 150*c*.

The second latching bolt 150*d*, also has a cylindrical lateral surface with longitudinal ribs 150*f* aligned axially disposed and symmetrically all around to intermesh with aligned axially mating ribs correspondingly disposed on the inner lateral surface of the receiving space 160*o*', 160*o*" so that the second latching bolt 150*d* is secured against twisting and can nevertheless move axially in the receiving space 160*o*', 160*o*" (FIG. 29*a*).

The end faces facing each other of the first latching bolt 150*c* and the second latching bolt 150*d* are each provided with two diametrically disposed claws 150*m*', 150*m*", wherein the coupling claws 150*m*', 150*m*" of one latching bolt 150*c*, 150*d* engage in the claw pockets 150*n*', 150*m*" of the other latching bolt 150*c*, 150*d* and form a claw coupling 150*m*', 150*m*", 150*n*', 150*n*".

A guide pin 150*h* is disposed in the center of the end face of the second latching bolt 150*d* that faces the first latching bolt 150*c* and is received in a drill-hole 150*i* disposed in the center of the second latching bolt 150*d* to align the two latching bolts 150*c*, 150*d* with each other.

The flanks of the claws 150*m*', 150*m*" are conical so that, when a certain limit load of the tabletop 160 is exceeded and the torque on the claw coupling 150*m*', 150*m*", 150*n*', 150*n*" increases accordingly, the second latching bolt 150*d* is pressed against the compression spring 150*e* and the claw coupling 150*m*', 150*m*", 150*n*', 150*n*" is released, wherein the centering of the two latching bolts 150*c*, 150*d* is maintained by the guide pin 150*h* in the drill-hole 150*i*.

In normal use, the two latching bolts 150*c*, 150*d* are permanently connected to each other by claw coupling 150*m*', 150*m*", 150*n*', 150*n*" and rotate together with the tabletop 160 at an angle of rotation of 90° between the non-working position and the working position, which are determined by the stop ribs 150*o*', 150*o*" on the first latching bolt 150*c* and the counterstops 150*p*', 150*p*" in the outer receiving space 140*k*', 140*k*". The rotary movements are inhibited by the friction brake 150*k*, 150*l* (FIGS. 26, 30 and 27, 31).

If the limit load of the tabletop 160 is exceeded in the working position (e.g. because somebody leans on the tabletop or in an accident), the claw coupling 150*c*, 150*d*, 150*n*', 150*n*" is released and the second latching bolt 150*d* can rotate freely so that the tabletop 160 can fold downward (FIG. 28, 32).

An open guide channel 140*h* is disposed in the center of the closed rear side 140*b* of the carrier element 140 which extends from the cutout 140*d*' to the upper end 140*c* of the carrier element 140 and is open to the top. Toothed racks 140*i*', 140*i*" are disposed on the lateral guide ribs 140*h*', 140*h*" of the guide channel 140*h*.

Figure 14:
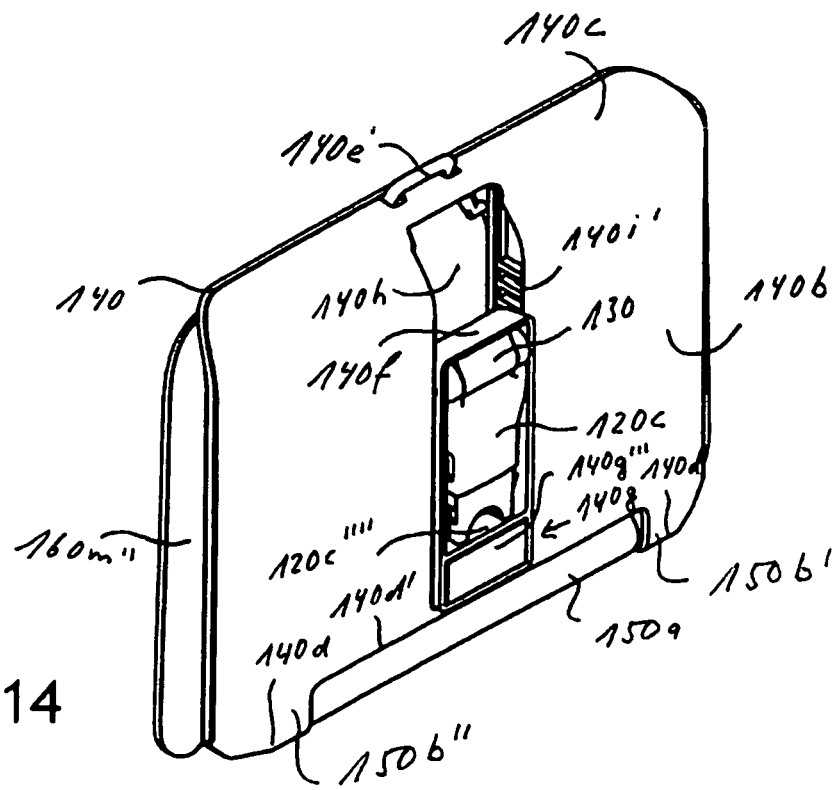
FIG. 14 shows a perspective view from behind, of the folding table according to FIG. 13.
Figures 15, 16:
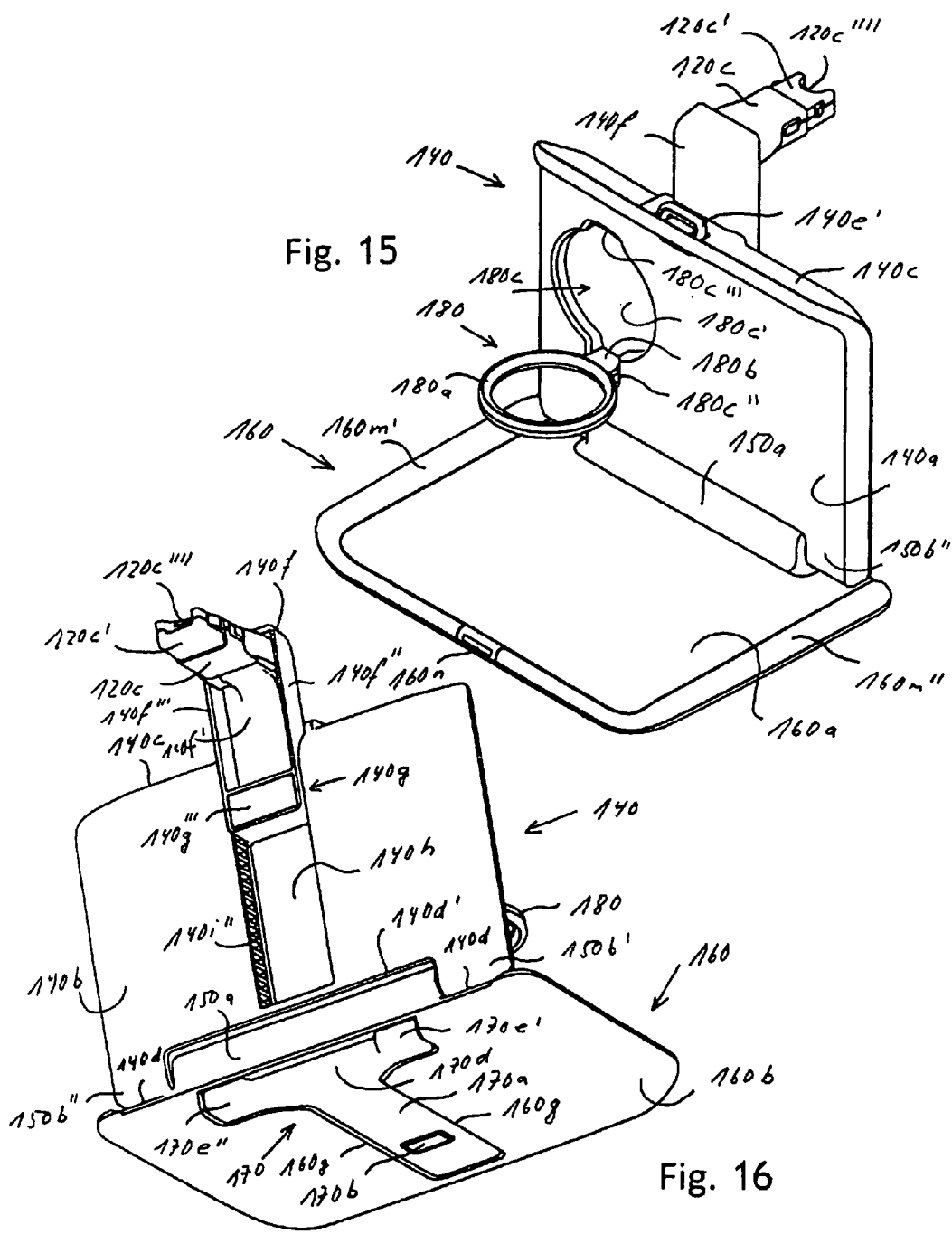
FIG. 15 shows a perspective view from the front, of the folding table according to FIG. 13 in the working position, with the adjustment slide in the uppermost position, the plug element folded out, and the cup holder folded out.
FIG. 16 shows a perspective view from behind, of the folding table according to FIG. 15

The guide channel 140*h* has an adjustment slide 140*f* which is guided by means of slide guides 140*m*, 140*m*' disposed below the toothed racks 140*i*', 140*i*" and can be moved from a lower limit position in which it is completely received in the guide channel 140*h* (FIG. 14) into an upper limit position in which it projects beyond the upper end 140*c* of the carrier element 140 (FIGS. 15 and 16).

The adjustment 140*f* is trough-shaped and is open on the wide side facing away from the carrier element 140.

The lower end of the adjustment slide 140*f* has a cross-member 140*g* that forms a receiving housing for two locking bars 140*g*', 140*g*", a locking spring 140*g*''' and a locking button 140*g*'''' which covers the open wide side of the cross-member 140*g*.

The two locking bars 140*g*', 140*g*" are disposed one above the other and are pressed by locking springs 140*g*''' through the through-holes provided on the side walls 140*f*''', 140*f*'''' of the adjustment slide 140*f* against the toothed racks 140*i*', 140*i*" on the lateral guide ribs 140*h*', 140*h*" of the guide channel 140*h*, whereby the adjustment slide 140*f* is blocked in the guide channel 140*h*. By pressing on the locking button 140*g*'''', the locking bars 140*g*', 140*g*" are moved toward each other via redirection elements 140*n*', 140*n*" and decoupled from the toothed racks 140*i*', 140*i*" so that the adjustment slide 140*f* can be displaced in the guide channel 140*h*.

The plug element 120*c* is connected to the upper end of the adjustment slide 140*f* via the second joint 130 and can be folded into the receiving space 140*f* when not in use (FIG. 14, 20, 23).

For convenient folding out, a grip recess 120*c*''' is disposed in the plug section 120*c*' of the plug element 120*c*.

Figure 23:
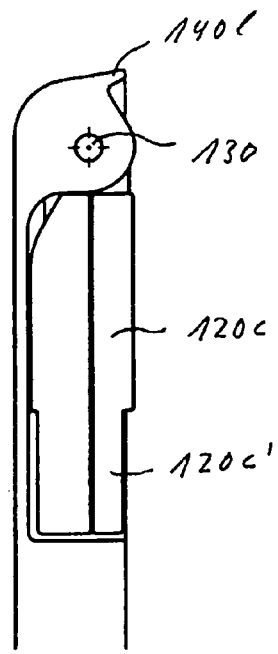
FIG. 23 shows a sectional detail view of the adjustment slide with the plug element folded in FIG. 24 shows a sectional detail view of the adjustment slide according to FIG. 23 with the plug element folded out 90°.
Figure 24:
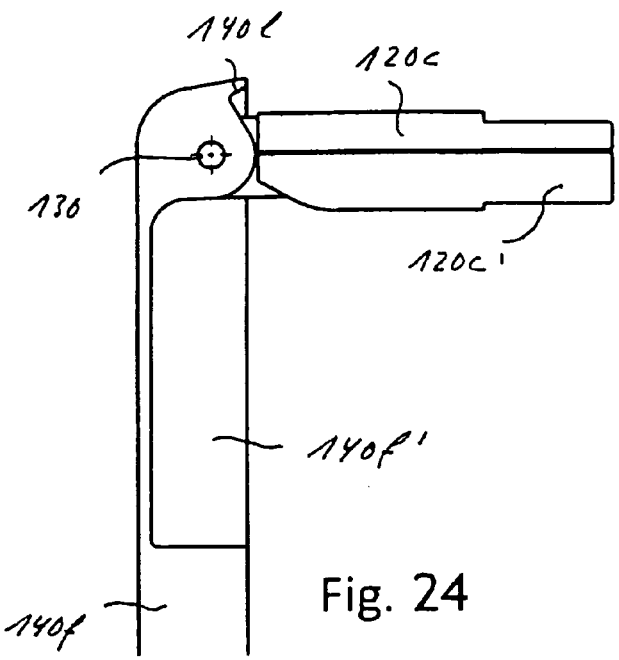
Figure 25:
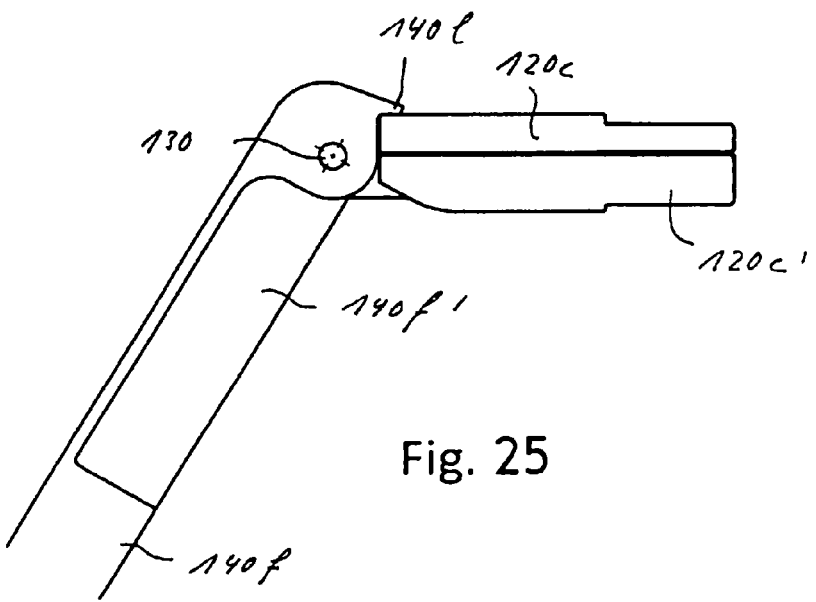
FIG. 25 shows a sectional detail view of the adjustment slide according to FIGS. 23 and 24 with the maximum fold-out angle of the plug element defined by the stop.
Figure 33:
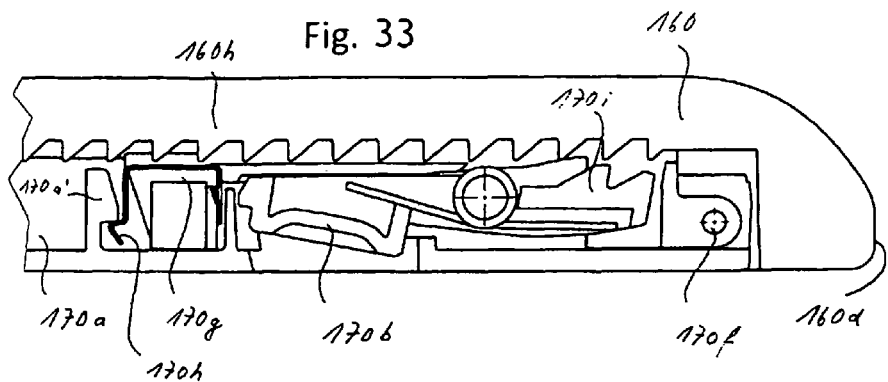
FIG. 33 shows a sectional detail view of the supporting element with the release button and the overload protection mechanism in the retracted position.
Figure 34:
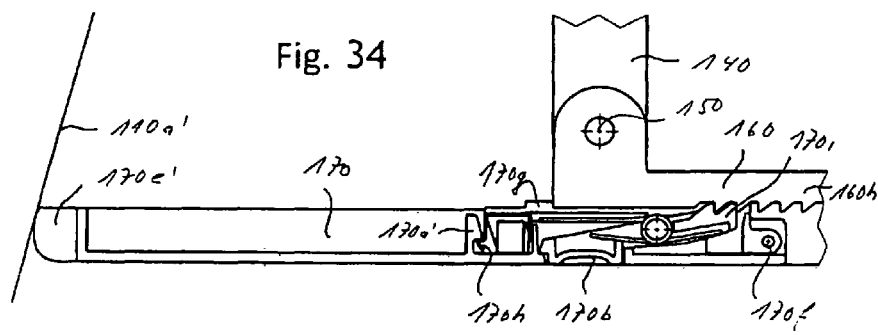
FIG. 34 shows a sectional view of the supporting element in the extended position.

The second joint 130 and the plug element 120*c* are covered by the adjustment slide 140*f*. A stop 140*l* limits the fold-out angle of the plug element 120*c* so that the carrier element 140 can only be pivoted out at a defined angle from the backrest 110*a* without endangering the passengers on the backseat (FIGS. 23-25).

Because of the second joint 130, which is disposed offset with respect to the carrier element 140 toward the backrest 110*a*, an inclined orientation of the carrier element 140 results due to the center of gravity, so that, in the working position, the slide-out supporting element 170 rests on the rear side 110*a*' of the backrest 110*a* without placing a load on the tabletop 160 and, in the non-working position, the folding table lies against at the inclination of the rear side 110*a*' of the backseat 110*a*. The second joint 130 is provided with a friction brake so that the carrier element 140 is also held stably in slightly inclined orientations.

In the working position, the horizontal orientation of the tabletop 160 or the vertical orientation of the carrier element 140 is set with the supporting element 170. Depending on the contour and the inclined position of the backrest 110*a*, the supporting element 170 is pushed the right distance out of the tabletop 160 for the supporting elements 170*e*', 170*e*" to rest on the rear side 110*a*' of the backrest 110*a* and the desired orientation of the tabletop 160 to be set.

At the rear end of the guide shaft 170*a*, the supporting element 170 is pivotably connected to a pivot axle 170*f* at the rear end of a guide slide 170*g* which is guided in the guide rail 160*g* on the underside 160*b* of the tabletop 160 such that it can be linearly displaced. The front end of the guide slide 170*g* has a spring clip 170*h* with which the guide shaft 170*a* is held on the guide slide 170*g* with the hook 170*a*'.

A spring-loaded release button 170*b* in the form of a rocker is disposed on the guide slide 170*g* and has a tooth segment 170*i* that engages in the toothed rack 160*h* disposed in the tabletop 160 parallel with the guide rail 160*g* to hold the supporting element 170 in the desired position. The toothed rack 160*h* is provided with saw tooth gearing so that the supporting element 170 can be pushed out of the tabletop 160 without operating the release button 170*b*, whereas the release button 170*b* has to be pressed to move the supporting element 170 into the tabletop 160.

If the overload protection mechanism of the tabletop 160 (as described above) is activated by an excessive load so that the tabletop 160 folds downward out of the working position, the guide shaft 170*a* is released from the spring clip 170*h* so that the overload function of the tabletop 160 is not impeded and the tabletop 160 can freely fold downward to avoid damaging the supporting element 170 or the rear side 110*a*' of the backrest 110*a*.

Figure 35:
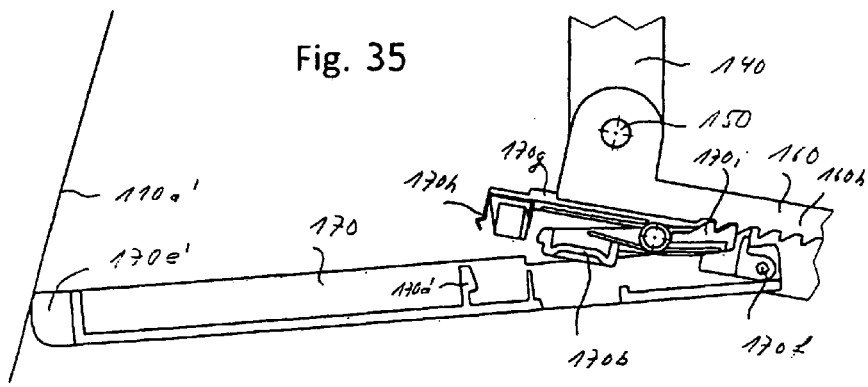
FIG. 35 shows a sectional view of the supporting element according to FIG. 34 with the overload protection mechanism activated.

After the overload protection mechanism has been triggered, the guide shaft 170*a* can be folded up about the pivot axle 170*f* and latched back into the spring clip 170*h* (FIG. 35).

A fold-out cup holder 180 is mounted on the front side 140*a* of the carrier element 140 and comprises a ring-shaped carrier 180*a* with a joint extension 180*b* and two decoration rings 180*g*', 180*g*" inset into the carrier 180*a* (FIG. 15).

Figure 39:
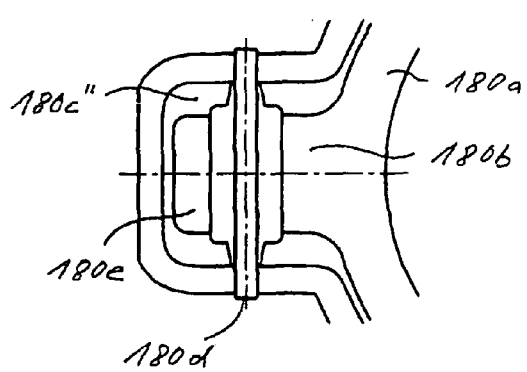
FIG. 39 shows a sectional detail view of the storage area of the cup holder

The carrier element 140 has a round shell-shaped recess 180*c* into which the cup holder 180 is folded when not in use. The underside of the recess 180*c* has a projection 180*c*" in which the joint extension 180*b* is held in the carrier element 140 with an axle 180*d* that is aligned parallel with the front side 140*a* and horizontally (FIG. 39).

Figure 36:
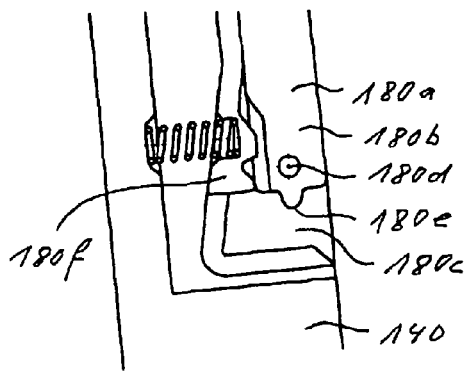
FIG. 36 shows a sectional detail view of the latching device for the cup holder with the cup holder in the folded-in non-working position.
Figure 37:
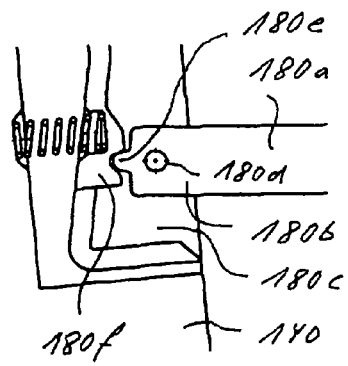
FIG. 37 shows a sectional detail view of the latching device according to FIG. 36 with the cup holder in the working position.

The joint extension 180*b* is extended beyond the axle 180*d* with a latching tongue 180*e* that engages in a spring-loaded latching element 180*f* disposed on the base surface 180*c*' of the recess 180*c* to preload the carrier 180*a* in the folded-in non-working position and in the 90° folded-out working position and fix it in these positions (FIGS. 36, 37).

Figure 38:
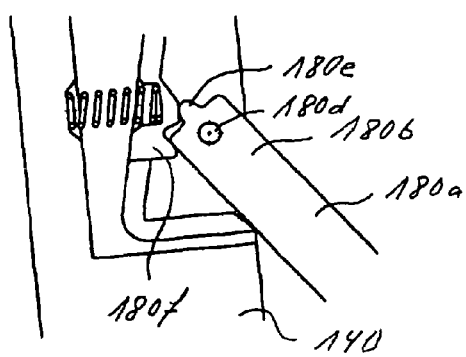
FIG. 38 shows a sectional detail view of the latching device according to FIGS. 36 and 37 in the overload position.

Upon overload, the carrier 180*a* can move beyond the 90° working position against the folded-out tabletop 160, for which purpose a higher latching force produced by corresponding geometry on the latching element 180*f* must be overcome (FIG. 38).

A finger recess 180*c*'" for folding out the carrier 180*a* is disposed on the recess 180*c* diametrically to the projection 180*c*".

Figure 40:
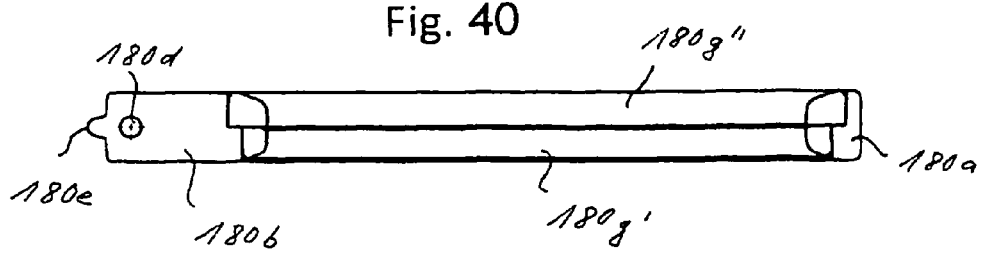
FIG. 40 shows a longitudinal section through the cup holder

Decoration rings 180*g*', 180*g*" are inset on both sides of the carrier 180*a* and are preferably implemented in a color contrasting with the carrier element 140 and the carrier 180*a* (FIG. 40).

Figure 42:
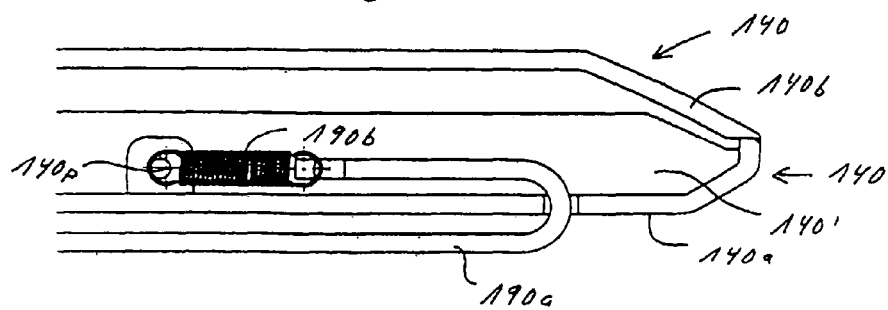
FIG. 42 shows a sectional detail view of the carrier element with the holding device

FIGS. 41 and 42 show a holding device 190 in the form of an elastic tensioned belt 190*a* disposed on the front side 140*a* of the carrier element 140, which extends parallel with the folded-out tabletop 160 over a large part of the width of the carrier element 140 and whose ends are guided through two slits 140*o*' 140" into the interior space 140' of the carrier element 140 and are tensioned with tension springs 190*p* that are fastened to spring attachments 140*p* in the carrier element 140.

We claim:

1. A folding table for attachment to the rear side of a vehicle seat part, a vehicle seat backrest, a vehicle seat head support or a vehicle seat head support mounting, the folding table comprising:
   a fastening device for fastening the folding table to the vehicle seat part;
   a carrier element which is connected to and which extends downwardly from said fastening device;
   a tabletop;
   a first joint disposed at a lower end of said carrier element, wherein said tabletop is rotatably connected to said carrier element via said first joint for pivoting between a non-working position in which said tabletop is aligned approximately parallel to said carrier element and a working position in which said tabletop is at an angle of approximately 80° to 120° with respect to said carrier element;
   a second joint disposed between and connecting said carrier element to said fastening device, said second joint having an axis of rotation which extends parallel to an axis of rotation of said first joint;
   propping elements disposed on said tabletop and approximately symmetric relative to a rear end face thereof;
   a common actuating member cooperating with said propping elements, wherein, when said tabletop is in said working position, said propping elements are moved together towards the vehicle seat part by said common actuating member; and
   a manually releasable latching device cooperating with said propping elements to simultaneously fix said propping elements in different positions, to align said tabletop in a horizontal position and to load support said tabletop on the vehicle seat part.

2. The folding table of claim 1, wherein said propping elements and said actuating member together form a supporting element.

3. The folding table of claim 2, wherein said supporting element is guided with a linear guide on said tabletop and, in a non-working position, is substantially received in recesses of said tabletop.

4. The folding table of claim 3, wherein said linear guide comprises a guide rail, which is disposed on said tabletop approximately centrally between lateral end faces and parallel thereto and in which a guide shaft, disposed on said supporting element, is guided.

5. The folding table of claim 4, wherein said supporting element has a supporting plate aligned approximately parallel with a rear end face of said tabletop at an end of said guide shaft facing the vehicle seat part, wherein said supporting element extends approximately a same distance toward said two lateral end faces on both sides of said guide shaft.

6. The folding table of claim 5, wherein said propping elements rest on the vehicle seat part and are disposed at two free ends of said supporting plate.

7. The folding table of claim 3, wherein grip strips are disposed on said supporting element with which said supporting element can be moved in two directions.

8. The folding table of claim 7, wherein a recess is provided on an underside of said tabletop in which a release button and said grip strips are accessible along an entire displacement path of said supporting element.

9. The folding table of claim 2, wherein said latching device comprises a toothed rack disposed on said tabletop into which a locking element disposed on said supporting element engages and is disengaged from the toothed rack with said release button.

10. The folding table of claim 9, wherein said release button is positioned near to an end of said guide shaft that faces a front end face of said tabletop.

11. The folding table of claim 2, wherein said tabletop has an overload protection mechanism that permits said tabletop to be pivoted downward out of the working position when said tabletop is overloaded, said supporting element being connected to said tabletop via a mounting which releases upon application of force to said supporting element resulting from pivoting away of said tabletop so that downward pivoting movement of said tabletop is not impeded by said supporting element.

12. The folding table of claim 11, wherein said mounting comprises a guide slide which is guided in a guide rail on said tabletop, said supporting element being pivotably connected at a rear end thereof to a rear end of said slide by a pivot axle and is releasably held at a front end of said guide slide by a spring clip so that said supporting element is pressed out of said spring clip with sufficient application of force to pivot away, downwardly about said pivot axle.

13. The folding table of claim 1, wherein said carrier element is connected to said fastening device via a coupling having a manually releasable latching device.

14. The folding table of claim 13, wherein said coupling comprises a receiving socket disposed on a fastening element and a plug element, connected to said carrier element, that can be plugged into said receiving socket and latched.

15. The folding table of claim 14, wherein said fastening element is constituted as a clamping element that can be clamped between two bars of the head support mounting, said receiving socket being disposed approximately centrally on said clamping element.

16. The folding table of claim 1, wherein inner and outer joint extensions are disposed at a lower end of said carrier element and at a rear end of said tabletop that mutually engage, wherein hollow-cylinder-shaped inner and outer receiving spaces for receiving two joint sections of said first joint are formed in said joint extensions.

17. The folding table of claim 16, wherein said joint sections are structured with mirror symmetry and comprise a first latching bolt which is received in one of said inner and outer receiving spaces, and a second latching bolt which is pressed against said first latching bolt by a compression spring and is received in an other one of said inner and outer receiving spaces together with said compression spring.

18. The folding table of claim 17, wherein said first latching bolt has a cylindrical lateral surface with axially aligned stop ribs, an inner lateral surface of said receiving space in which said first latching bolt is held having axially aligned counterstops which limit an angle of rotation of said first latching bolt to approximately 80° to 90°.

19. The folding table of claim 18, wherein a free end face of said first latching bolt is constituted as a cone which is held in a cone-shaped bearing shell on an inner end face of said receiving space in which said first latching bolt is received and which forms a stop for axial movement of said first latching bolt as well as a friction brake to inhibit rotary movement of said latching bolt.

20. The folding table of claim 19, wherein said second latching bolt has a cylindrical lateral surface with axially aligned longitudinal ribs which intermesh with axially aligned mating ribs correspondingly disposed on an inner lateral surface of said receiving space in which said second latching bolt is received so that said second latching bolt is secured against twisting and can move axially in said receiving space.

21. The folding table of claim 20, wherein coupling claws or claw pockets are disposed on opposite facing end faces of said first latching bolt and of the second latching bolt which engage in each other and form a claw coupling.

22. The folding table of claim 21, wherein flanks of said coupling claws and said claw pockets are conical so that, when a certain limit load of said tabletop is exceeded with a corresponding increase in torque, said first and the second latching bolts are pressed further and further apart against the force of said compression spring until said claw coupling disengages and said tabletop folds down out of the working position.

23. The folding table of claim 1, wherein a locking element is disposed at an upper end of said carrier element with which said tabletop is retained on said carrier element in the non-working position at a front end face thereof.

24. The folding table of claim 23, wherein said carrier element is cambered at an upper end thereof against said tabletop and covers a front end face of said tabletop in the non-working position, wherein said locking element projects out of an opening in the cambered inner side of said carrier element and engages in a recess disposed on an end face of said tabletop.

25. The folding table of claim 1, wherein a fold-out cup holder is disposed on a front side of said carrier element to fold from a non-working position, within a shell-shaped recess in said carrier element, into a working position, aligned approximately parallel with said tabletop, a spring-loaded latching element preloading and fixing said cup holder in the non-working position and in the working position.

26. The folding table of claim 25, wherein said cup holder pivots away downwardly out of the working position against said tabletop when overloaded.

27. A folding table for attachment to a rear side of a vehicle seat part, a vehicle seat backrest, a vehicle seat head support or a vehicle seat head support mounting, the folding table comprising:
  a fastening device for fastening the folding table to the vehicle seat part;
  a carrier element connected to and extending downwardly from said fastening device;
  a tabletop;
  a first joint disposed at a lower end of said carrier element, said first joint rotatably connecting said tabletop to said carrier element, wherein said tabletop pivots between a non-working position in which said tabletop is aligned approximately parallel to said carrier element and a working position in which said tabletop is at an angle of approximately 80° to 120° with respect to said carrier element;
  an adjustment slide disposed between and connecting said carrier element to said fastening device so that a distance between said tabletop and said fastening device is adjustable;
  a second joint disposed between and connecting said adjustment slide to said fastening device, said second joint having an axis of rotation which is parallel to an axis of rotation of said first joint; and
  a coupling disposed between and connecting said second joint to said fastening device, said coupling having a manually releasable latching device,
  wherein a vertically aligned guide is disposed on a rear side of said carrier element in which said adjustment slide is held and is fixed in different positions via a manually releasably latching device.

28. The folding table of claim 27, wherein said latching device comprises a locking bar disposed on said adjustment slide and a toothed rack disposed on said carrier element, wherein said locking bar is held engaged in said toothed rack by a locking spring, wherein said locking bar is disengaged from said toothed rack using a locking button disposed on said adjustment slide.

29. The folding table of claim 28, wherein an interior space is formed between a front side and a rear side of said carrier element, in which a central disposed upwardly open guide channel for said adjustment slide is disposed, outer contours of said adjustment slide and said rear side of said carrier element being approximately mutually aligned, wherein one toothed rack is disposed on each opposite side of said guide ribs that form side walls of said guide channel, wherein two opposite locking bars enter into operative connection with said toothed racks through openings in side walls of said adjustment slide.

30. The folding table of claim 27, wherein inner and outer joint extensions are disposed at a lower end of said carrier element and at a rear end of said tabletop that mutually engage, wherein hollow-cylinder-shaped inner and outer receiving spaces for receiving two joint sections of said first joint are formed in said joint extensions.

31. The folding table of claim 30, wherein said joint sections are structured with mirror symmetry and comprise a first latching bolt which is received in one of said inner and outer receiving spaces, and a second latching bolt which is pressed against said first latching bolt by a compression spring and is received in an other one of said inner and outer receiving spaces together with said compression spring.

32. The folding table of claim 31, wherein said first latching bolt has a cylindrical lateral surface with axially aligned stop ribs, an inner lateral surface of said receiving space in which said first latching bolt is held having axially aligned counter stops which limit an angle of rotation of said first latching bolt to approximately 80° to 90°.

33. The folding table of claim 32, wherein a free end face of said first latching bolt is constituted as a cone which is held in a cone-shaped bearing shell on an inner end face of said receiving space in which said first latching bolt is received and which forms a stop for axial movement of said first latching bolt as well as a friction brake to inhibit rotary movement of said latching bolt.

34. The folding table of claim 33, wherein said second latching bolt has a cylindrical lateral surface with axially aligned longitudinal ribs which intermesh with axially aligned mating ribs correspondingly disposed on an inner lateral surface of said receiving space in which said second latching bolt is received so that said second latching bolt is secured against twisting and can move axially in said receiving space.

35. The folding table of claim 34, wherein coupling claws or claw pockets are disposed on opposite facing end faces of said first latching bolt and of the second latching bolt which engage in each other and form a claw coupling.

36. The folding table of claim 35, wherein flanks of said coupling claws and said claw pockets are conical so that, when a certain limit load of said tabletop is exceeded with a corresponding increase in torque, said first and the second latching bolts are pressed further and further apart against the force of said compression spring until said claw coupling disengages and said tabletop folds down out of the working position.

37. The folding table of claim 27, wherein said tabletop has an overload protection mechanism that permits said tabletop to be pivoted downward out of the working position when said tabletop is overloaded, said supporting element being connected to said tabletop via a mounting which releases upon application of force to said supporting element resulting from pivoting away of said tabletop so that downward pivoting movement of said tabletop is not impeded by said supporting element.

38. The folding table of claim 37, wherein said mounting comprises a guide slide which is guided in a guide rail on said tabletop, said supporting element being pivotably connected at a rear end thereof to a rear end of said slide by a pivot axle and is releasably held at a front end of said guide slide by a spring clip so that said supporting element is pressed out of said spring clip with sufficient application of force to pivot away, downwardly about said pivot axle.

39. The folding table of claim 27, wherein a locking element is disposed at an upper end of said carrier element with which said tabletop is retained on said carrier element in the non-working position at a front end face thereof.

40. The folding table of claim 39, wherein said carrier element is cambered at an upper end thereof against said tabletop and covers a front end face of said tabletop in the non-working position, wherein said locking element projects out of an opening in the cambered inner side of said carrier element and engages in a recess disposed on an end face of said tabletop.

41. The folding table of claim 27, wherein a fold-out cup holder is disposed on a front side of said carrier element to fold from a non-working position, within a shell-shaped recess in said carrier element, into a working position, aligned approximately parallel with said tabletop, a spring-loaded latching element preloading and fixing said cup holder in the non-working position and in the working position.

42. The folding table of claim 41, wherein said cup holder pivots away downwardly out of the working position against said tabletop when overloaded.

43. A folding table for attachment to a rear side of a vehicle seat part, a vehicle seat backrest, a vehicle seat head support or a vehicle seat head support mounting, the folding table comprising:
a fastening device for fastening the folding table to the vehicle seat part;
a carrier element connected to and extending downwardly from said fastening device;
a tabletop;
a first joint disposed at a lower end of said carrier element, said first joint rotatably connecting said tabletop to said carrier element, wherein said tabletop pivots between a non-working position in which said tabletop is aligned approximately parallel to said carrier element and a working position in which said tabletop is at an angle of approximately 80° to 120° with respect to said carrier element;
an adjustment slide disposed between and connecting said carrier element to said fastening device so that a distance between said tabletop and said fastening device is adjustable;
a second joint disposed between and connecting said adjustment slide to said fastening device, said second joint having an axis of rotation which is parallel to an axis of rotation of said first joint; and
a coupling disposed between and connecting said second joint to said fastening device, said coupling having a manually releasable latching device,
wherein said coupling comprises a receiving socket disposed on an attachment element as well as a plug element connected to said second joint, wherein said plug element plugs into and locks within said receiving socket.

44. The folding table of claim 43, wherein said plug element is connected to an upper end of said adjustment slide via said second joint and wherein a receiving space is provided on said adjustment slide into which said plug element is folded for space-saving stowage.

45. The folding table of claim 44, wherein a cross-member is disposed between said receiving space and a lower end of said adjustment slide in which a locking bar, a locking button and a locking spring are received, outer contours of said locking button and said adjustment slide being approximately mutually aligned.

46. The folding table of claim 43, wherein inner and outer joint extensions are disposed at a lower end of said carrier element and at a rear end of said tabletop that mutually engage, wherein hollow-cylinder-shaped inner and outer receiving spaces for receiving two joint sections of said first joint are formed in said joint extensions.

47. The folding table of claim 46, wherein said joint sections are structured with mirror symmetry and comprise a first latching bolt which is received in one of said inner and outer receiving spaces, and a second latching bolt which is pressed against said first latching bolt by a compression spring and is received in an other one of said inner and outer receiving spaces together with said compression spring.

48. The folding table of claim 47, wherein said first latching bolt has a cylindrical lateral surface with axially aligned stop ribs, an inner lateral surface of said receiving space in which said first latching bolt is held having axially aligned counterstops which limit an angle of rotation of said first latching bolt to approximately 80° to 90°.

49. The folding table of claim 48, wherein a free end face of said first latching bolt is constituted as a cone which is held in a cone-shaped bearing shell on an inner end face of said receiving space in which said first latching bolt is received and which forms a stop for axial movement of said first latching bolt as well as a friction brake to inhibit rotary movement of said latching bolt.

50. The folding table of claim 49, wherein said second latching bolt has a cylindrical lateral surface with axially aligned longitudinal ribs which intermesh with axially aligned mating ribs correspondingly disposed on an inner lateral surface of said receiving space in which said second latching bolt is received so that said second latching bolt is secured against twisting and can move axially in said receiving space.

51. The folding table of claim 50, wherein coupling claws or claw pockets are disposed on opposite facing end faces of said first latching bolt and of the second latching bolt which engage in each other and form a claw coupling.

52. The folding table of claim 51, wherein flanks of said coupling claws and said claw pockets are conical so that, when a certain limit load of said tabletop is exceeded with a corresponding increase in torque, said first and the second latching bolts are pressed further and further apart against the force of said compression spring until said claw coupling disengages and said tabletop folds down out of the working position.

53. The folding table of claim 43, wherein said tabletop has an overload protection mechanism that permits said tabletop to be pivoted downward out of the working position when said tabletop is overloaded, said supporting element being connected to said tabletop via a mounting which releases upon application of force to said supporting element resulting from pivoting away of said tabletop so that downward pivoting movement of said tabletop is not impeded by said supporting element.

54. The folding table of claim 53, wherein said mounting comprises a guide slide which is guided in a guide rail on said tabletop, said supporting element being pivotably connected at a rear end thereof to a rear end of said slide by a pivot axle and is releasably held at a front end of said guide slide by a spring clip so that said supporting element is pressed out of said spring clip with sufficient application of force to pivot away, downwardly about said pivot axle.

55. The folding table of claim 43, wherein a locking element is disposed at an upper end of said carrier element with which said tabletop is retained on said carrier element in the non-working position at a front end face thereof.

56. The folding table of claim 55, wherein said carrier element is cambered at an upper end thereof against said tabletop and covers a front end face of said tabletop in the non-working position, wherein said locking element projects out of an opening in the cambered inner side of said carrier element and engages in a recess disposed on an end face of said tabletop.

57. The folding table of claim 43, wherein a fold-out cup holder is disposed on a front side of said carrier element to fold from a non-working position, within a shell-shaped recess in said carrier element, into a working position, aligned approximately parallel with said tabletop, a spring-loaded latching element preloading and fixing said cup holder in the non-working position and in the working position.

58. The folding table of claim 57, wherein said cup holder pivots away downwardly out of the working position against said tabletop when overloaded.

\* \* \* \* \*